US006256326B1

(12) United States Patent
Kudo

(10) Patent No.: US 6,256,326 B1
(45) Date of Patent: Jul. 3, 2001

(54) PSEUDO-SYNCHRONIZATION PREVENTION METHOD IN SDH TRANSMISSION MODE, PSEUDO-SYNCHRONIZATION PREVENTING SDH TRANSMISSION SYSTEM, AND TRANSMITTER-RECEIVER IN PSEUDO-SYNCHRONIZATION PREVENTING SDH TRANSMISSION SYSTEM

(75) Inventor: Shoji Kudo, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/165,438

(22) Filed: Oct. 2, 1998

(30) Foreign Application Priority Data

Feb. 24, 1998  (JP) ................................. 10-042625

(51) Int. Cl.$^7$ ..................................................... H04J 3/06
(52) U.S. Cl. ........................................... 370/512; 370/514
(58) Field of Search .................................... 370/400, 408,
370/503, 509, 510, 511, 512, 513, 514,
515, 907; 375/354, 365, 369, 367, 368

(56) References Cited

U.S. PATENT DOCUMENTS

| 5,086,438 | * | 2/1992 | Sugata et al. | 375/365 |
| 5,136,587 | * | 8/1992 | Obana et al. | 370/535 |
| 5,140,618 | * | 8/1992 | Kinoshita et al. | 375/368 |
| 5,710,774 | * | 1/1998 | Suh et al. | 370/513 |
| 5,777,998 | * | 7/1998 | Traverso et al. | 370/509 |
| 5,784,380 | * | 7/1998 | Kuwahara | 370/509 |
| 5,862,143 | * | 1/1999 | Suh | 370/513 |

FOREIGN PATENT DOCUMENTS

| 62-48826 | 3/1987 | (JP) . |
| 62-168437 | 7/1987 | (JP) . |
| 2-53339 | 2/1990 | (JP) . |
| 6-6342 | 1/1994 | (JP) . |
| 8-84138 | 3/1996 | (JP) . |

* cited by examiner

Primary Examiner—Ricky Ngo
(74) Attorney, Agent, or Firm—Helfgott & Karas, P.C.

(57) ABSTRACT

In a terminal apparatus to which an SDH transmission mode is applied, there is a method including a pseudo-synchronization detecting step of detecting, by one transmitter-receiver, that a pseudo-synchronization state is established by finding in data the same pattern as a synchronization pattern in byte information, a pseudo-synchronization posting step of inserting, by the one transmitter-receiver, information to the effect that the pseudo-synchronization state is established in an overhead of an STM frame, and posting the information to the other transmitter-receiver, and a changed synchronization pattern transmitting step of changing a synchronization pattern into an additional synchronization pattern different from the synchronization pattern in the byte information, and transmitting the synchronization pattern obtained by the change from the other transmitter-receiver to the one transmitter-receiver. Thus, it is an object of the present invention to easily prevent pseudo-synchronization by posting the message to the effect that the pseudo-synchronization state is established to an opposite terminal apparatus by using the overhead of the STM frame such that the opposite terminal apparatus can change the synchronization pattern in the byte information.

8 Claims, 13 Drawing Sheets

FIG. 5(a)

| 1 | 2 | 3 | 4 | 5 | 6 | 7 | 8 | 9 | 10 | 11 | 12 | 13 | 14 |
|---|---|---|---|---|---|---|---|---|---|---|---|---|---|
| Fa | Fb | D1 | D2 | D3 | D4 | D5 | D6 | D7 | D8 | Fa | Fb | | |

←— ONE FRAME —→

FRAME PATTERN CHANGED

FIG. 5(b)

| Fb | Fa | D1 | D2 | D3 | D4 | D5 | D6 | D7 | D8 | Fb | Fa | | |

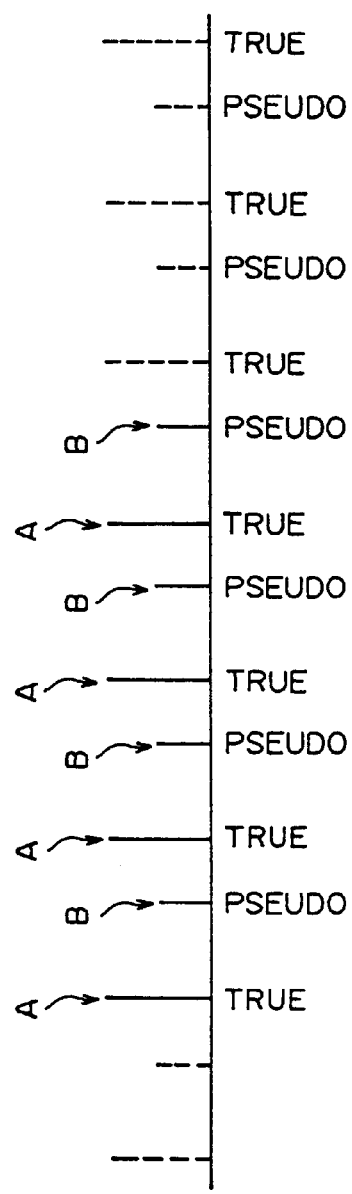
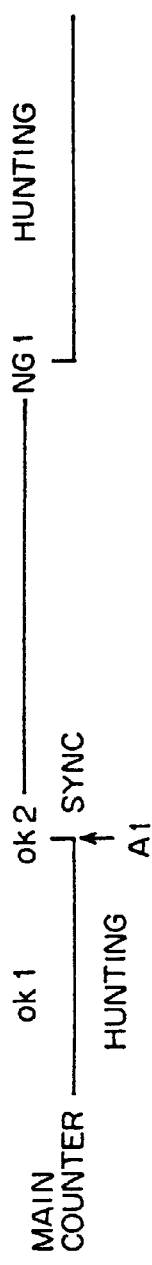
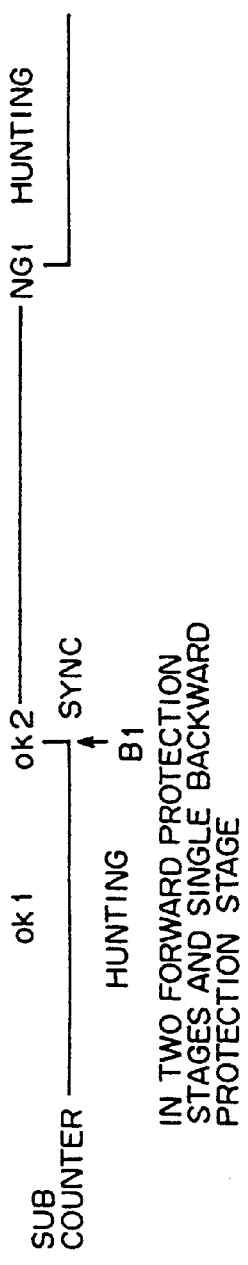
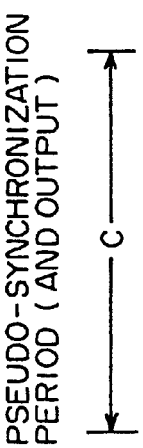
FIG. 7(a)
FIG. 7(b)
FIG. 7(c)
FIG. 7(d)

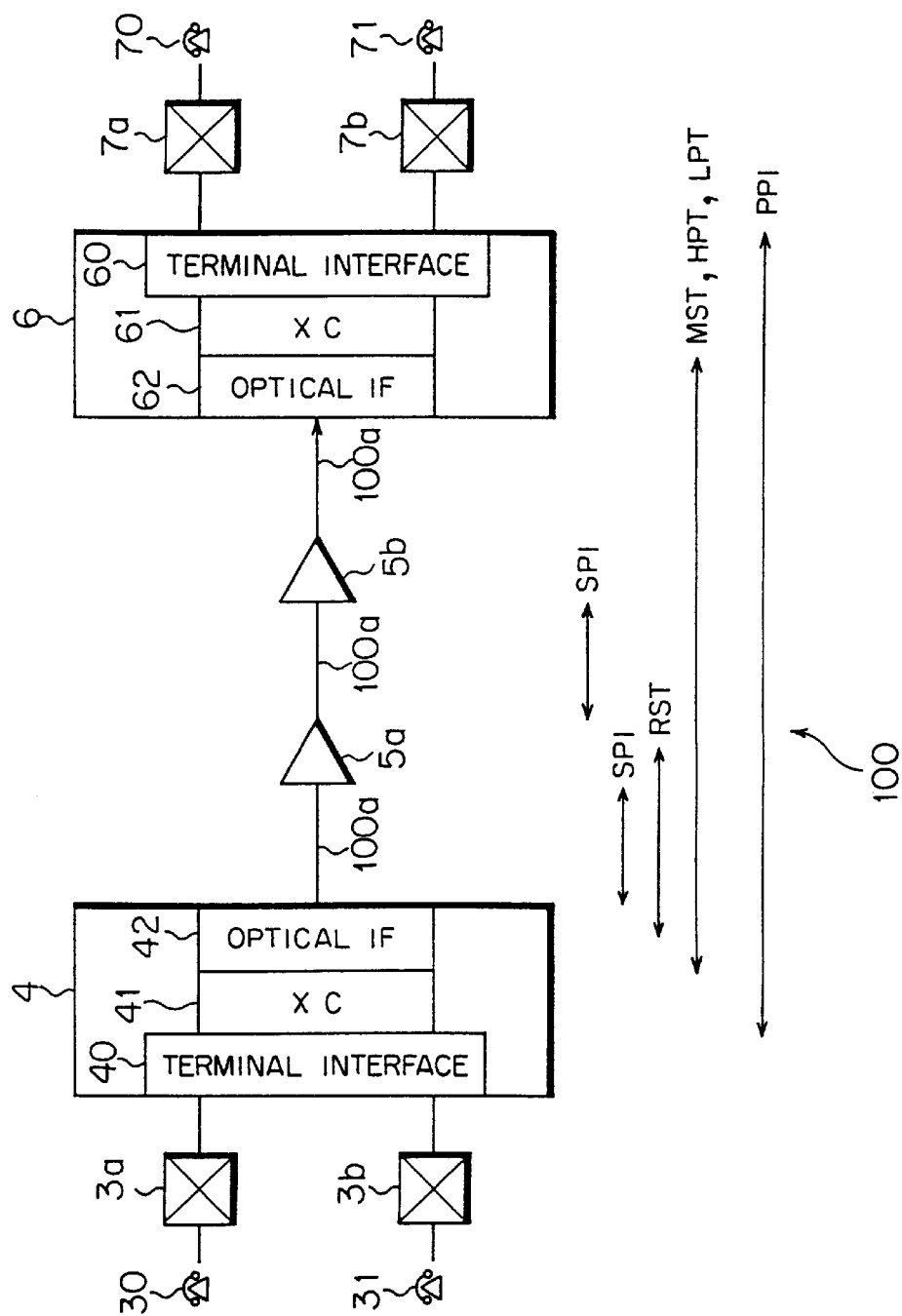

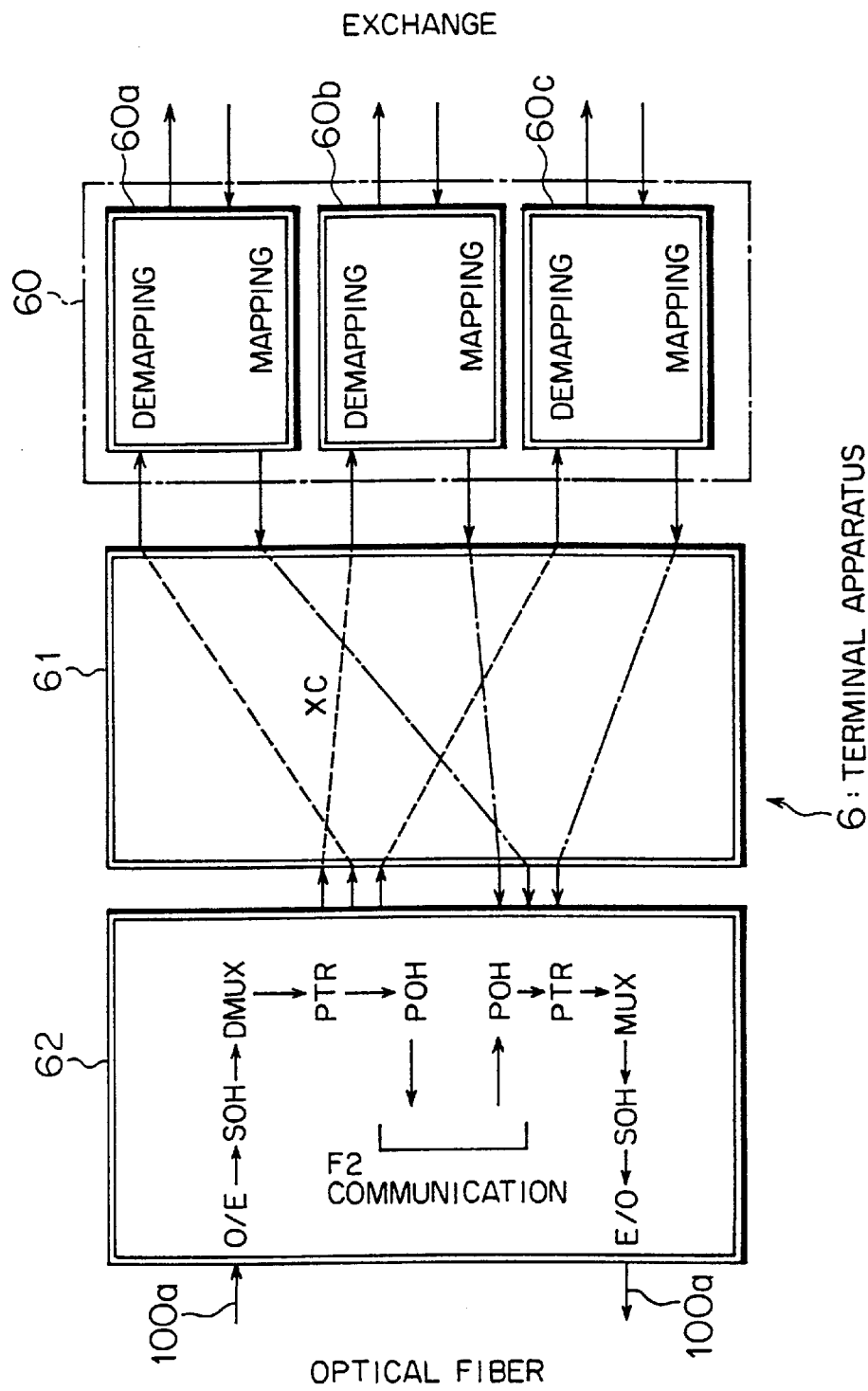

PSEUDO-SYNCHRONIZATION PREVENTION METHOD IN SDH TRANSMISSION MODE, PSEUDO-SYNCHRONIZATION PREVENTING SDH TRANSMISSION SYSTEM, AND TRANSMITTER-RECEIVER IN PSEUDO-SYNCHRONIZATION PREVENTING SDH TRANSMISSION SYSTEM

BACKGROUND OF THE INVENTION (1) Field of the Invention

The present invention relates to a pseudo-synchronization prevention method in an SDH transmission mode, a pseudo-synchronization preventing SDH transmission system, and a transmitter-receiver in the pseudo-synchronization preventing SDH transmission system, all of which are suitable for use in a transmission unit to which the SDH transmission mode is applied.

(2) Description of the Related Art

According to an SDH (Synchronous Digital Hierarchy) transmission mode defined in ITU-T, at a time of data transmission from one terminal apparatus to another terminal apparatus, data link is enabled between the terminal apparatus by using a container [minimum unit of transmission information such as F2 byte (UserCH)] in a VC (Virtual Container) path, that is, a clear channel provided to a user.

In the SDH transmission mode, data to be transmitted is inserted in a predetermined frame called STM (Synchronous Transport Module) frame, and is transmitted and received with synchronization established by using the STM frame. The STM frame includes a payload showing the data to be transmitted itself, and an overhead for a control of the data. The data to be transmitted is asynchronously inserted in the payload.

For this purpose, when transmission/reception of signal is made by using the asynchronously inserted data, a predetermined frame pattern (hereinafter often referred to as synchronization pattern) is allocated to a data row thereof to form a periodical frame bit.

For example, a frame format for the F2 byte has a simple frame structure having a small number of bits, in which a bit rate of the data row is 8 k b/s×8. Hence, in order to allocate the predetermined synchronization pattern in the frame format for the F2 byte, it is required to use the minimum number of bits.

However, data having the same synchronization pattern as the predetermined synchronization pattern used for the allocation may exist in a signal with an interval identical with that of the predetermined synchronization pattern. In such a case, a receiving side for receiving the above data may erroneously recognize a position of a header of the frame, resulting in possibility of pseudo-synchronization.

Thus, in order to prevent the pseudo-synchronization, there is a possible method including the steps of mounting two frame synchronization counters in the terminal apparatus, defining one counter as a counter for true synchronization and bringing the one counter into synchronization with a predetermined frame, and defining the other counter as a counter for pseudo-synchronization and bringing the other counter into synchronization with a frame other than the predetermined frame.

That is, in the system including the two counters as described above, when a certain error signal [such as CRC (Cyclic Redundancy Check) code] is outputted from a signal which has been brought into synchronization, the output signal triggers a discrimination between the true synchronization and the pseudo-synchronization.

However, in the above method, it is necessary to provide a special bit as error monitoring information in addition to the synchronization pattern allocated in the frame format for the F2 byte, resulting in a problem of an increase in number of bits other than those of the information to be transmitted (main information). That is, since the F2 byte has the frame structure with the small number of bits, the increase in number of bits used for information other than the main information reduces an amount of main information, thereby causing a reduction in transmission efficiency.

SUMMARY OF THE INVENTION

In view of the foregoing problem, it is an object of the present invention to provide a pseudo-synchronization prevention method in an SDH transmission mode, a pseudo-synchronization preventing SDH transmission system, and a transmitter-receiver in a pseudo-synchronization preventing SDH transmission system in which pseudo-synchronization can easily be prevented by posting a message to the effect that a pseudo-synchronization state is established to an opposite terminal apparatus by using an overhead of an STM frame, and changing a synchronization pattern in byte information in the opposite terminal apparatus.

Further, according to the present invention, for achieving the above-mentioned object, there is provided a pseudo-synchronization prevention method in an SDH transmission mode. The method includes, when a data transmission is made in the SDH transmission mode between a first transmitter-receiver and a second transmitter-receiver opposed to each other by using predetermined byte information in a VC path in an STM frame, a pseudo-synchronization detecting step of detecting, by a receiver in one transmitter-receiver of the first transmitter-receiver and the second transmitter-receiver, that a pseudo-synchronization state is established by finding the same pattern as a synchronization pattern in the byte information, a pseudo-synchronization posting step of, when establishment of the pseudo-synchronization state is detected in the pseudo-synchronization detecting step, causing a transmitter in the one transmitter-receiver to insert information to the effect that the pseudo-synchronization state is established in an overhead of the STM frame, and posting the information to a receiver in the other transmitter-receiver of the first transmitter-receiver and the second transmitter-receiver, and a changed synchronization pattern transmitting step of, when the establishment of the pseudo-synchronization state is posted to the receiver in the other transmitter-receiver in the pseudo-synchronization posting step, changing a synchronization pattern into an additional synchronization pattern different from the synchronization pattern in the byte information, and transmitting the synchronization pattern obtained by the change from a transmitter in the other transmitter-receiver to the receiver in the one transmitter-receiver.

Further, according to the present invention, a pseudo-synchronization prevention method in an SDH transmission mode may include an alarm generating step of giving an alarm when a pseudo-synchronization state is still detected in the pseudo-synchronization detecting step though a synchronization pattern is changed and transmitted a predetermined number of times in the changed synchronization pattern transmitting step.

On the other hand, there is provided a pseudo-synchronization preventing SDH transmission system including a first transmitter-receiver and a second transmitter-receiver opposed to each other for a data transmission made by using predetermined byte information in a VC path in an STM frame. In the pseudo-synchronization preventing SDH transmission system, a byte information receiving apparatus in one transmitter-receiver of the first transmitter-receiver and the second transmitter-receiver is provided with a pseudo-synchronization detecting unit to detect that a pseudo-synchronization state is established by finding the same pattern as a synchronization pattern in the byte information, and an STM frame transmitting apparatus in the one transmitter-receiver is provided with a pseudo-synchronization posting unit to, when the pseudo-synchronization detecting unit detects that the pseudo-synchronization state is established, insert information to the effect that the pseudo-synchronization state is established in an overhead of the STM frame, and post the information to an STM frame receiving apparatus in the other transmitter-receiver of the first transmitter-receiver and the second transmitter-receiver.

In addition, the STM frame receiving apparatus in the other transmitter-receiver is provided with a pseudo-synchronization posting information receiving unit to receive the information to the effect that the pseudo-synchronization state is established, posted from the pseudo-synchronization posting unit, and a byte information transmitting apparatus in the other transmitter-receiver is provided with a synchronization pattern changing unit to change a synchronization pattern into an additional synchronization pattern different from the synchronization pattern in the byte information, and a changed synchronization pattern transmitting unit to transmit the synchronization pattern obtained by the change in the synchronization pattern changing unit to the byte information receiving apparatus in the one transmitter-receiver.

Further, according to the present invention, there is provided a pseudo-synchronization preventing SDH transmission system in which the pseudo-synchronization detecting unit may include a plurality of counters to detect the synchronization pattern in the byte information or an additional synchronization pattern identical with the synchronization pattern with phases mutually shifted, and an arithmetic logic unit to perform arithmetic logic processing depending upon results of pattern detection in the counters so as to detect that the pseudo-synchronization state is established.

Further, according to the present invention, there is provided a pseudo-synchronization preventing SDH transmission system in which an alarm generating unit may be mounted to give an alarm when the pseudo-synchronization state is still detected in the pseudo-synchronization detecting unit though the changed synchronization pattern transmitting unit changes and transmits the synchronization pattern a predetermined number of times.

On the other hand, according to the present invention, in an SDH transmission system having a transmitter-receiver to make a data transmission to an additional opposite transmitter-receiver by using predetermined byte information in a VC path in an STM frame in an SDH transmission mode, there is provided a transmitter-receiver in a pseudo-synchronization preventing SDH transmission system. The transmitter-receiver includes an STM frame receiving apparatus to make a reception in a layer of the STM frame, and a byte information receiving apparatus connected to the STM frame receiving apparatus to receive predetermined byte information in the VC path of an order lower than that of the STM frame, and includes a byte information transmitting apparatus to transmit byte information of the same layer as that of the byte information, and an STM frame transmitting apparatus connected to the byte information transmitting apparatus to make a transmission in the layer of the STM frame. In the transmitter-receiver, the byte information receiving apparatus is provided with a pseudo-synchronization detecting unit to detect that a pseudo-synchronization state is established by finding in data the same pattern as a synchronization pattern in predetermined byte information in a VC path in an STM frame received through the STM frame receiving apparatus, and the STM frame transmitting apparatus is provided with a pseudo-synchronization posting unit to, when the pseudo-synchronization detecting unit detects that the pseudo-synchronization state is established, insert information to the effect that the pseudo-synchronization state is established in an overhead of the STM frame, and post the information to an STM frame receiving apparatus in an additional opposite transmitter-receiver.

Further, according to the present invention, there is provided a transmitter-receiver in a pseudo-synchronization preventing SDH transmission system, in which an alarm generating unit may be mounted to give an alarm when the pseudo-synchronization state is still detected in the pseudo-synchronization detecting unit though the synchronization pattern transmitted from the additional transmitter-receiver is changed a predetermined number of times.

Further, according to the present invention, in an SDH transmission system having a transmitter-receiver to make a data transmission to an additional opposite transmitter-receiver by using predetermined byte information in a VC path in an STM frame in an SDH transmission mode, there is provided a transmitter-receiver in a pseudo-synchronization preventing SDH transmission system. The transmitter-receiver includes an STM frame receiving apparatus to make a reception in a layer of the STM frame, and a byte information receiving apparatus connected to the STM frame receiving apparatus to receive predetermined byte information in the VC path of an order lower than that of the STM frame, and includes a byte information transmitting apparatus to transmit byte information of the same layer as that of the byte information, and an STM frame transmitting apparatus connected to the byte information transmitting apparatus to make a transmission in the layer of the STM frame. In the transmitter-receiver, the STM frame receiving apparatus is provided with a pseudo-synchronization posting information receiving unit to receive information to the effect that the pseudo-synchronization state is established from an additional opposite transmitter-receiver, and the byte information transmitting apparatus is provided with a synchronization pattern changing unit to change a synchronization pattern into an additional synchronization pattern different from the synchronization pattern in the byte information, and a changed synchronization pattern transmitting unit to transmit the synchronization pattern obtained by the change in the synchronization pattern changing unit to an additional opposite transmitter-receiver.

As described in detail above, according to the present invention, the pseudo-synchronization is detected depending upon the synchronization pattern of the predetermined byte information of the data. Further, when the pseudo-synchronization state is established, the layer (byte information in the unused overhead) higher than the layer of the predetermined byte information is used to post the message to the effect that the pseudo-synchronization state is established, and the apparatus to which the message is posted changes and returns the synchronization pattern. As a result, there are advantages in that the pseudo-synchronization state can rapidly be prevented, and throughput of the transmitter-receiver to which the present system is applied can significantly be enhanced.

Further, according to the present invention, when the pseudo-synchronization state is still kept though the synchronization pattern is changed the predetermined number of times, the alarm is given. There are advantages in that the link abnormality can be detected at an early stage, and resynchronization processing in the system can rapidly be performed.

In addition, according to the present invention, the pseudo-synchronization preventing SDH transmission system is provided with the two counters, and establishes the frame synchronization in response to a receive signal by itself. Consequently, it is possible to carry out predetermined count processing of any type of input signal such as signal sequence with a high error rate, or signal requiring fixed signaling. As a result, there are advantages in that a scope of application of the system can be expanded, and versatility can be enhanced.

BRIEF DESCRIPTION OF THE DRAWINGS

FIGS. 5(a), (b) are diagrams for explaining a method of changing a synchronization pattern in a synchronization pattern changing unit according to one embodiment of the present invention;

FIGS. 7(a) to 7(d) are diagrams for explaining a method of detecting pseudo-synchronization by counters according to one embodiment of the present invention;

FIG. 9 is a block diagram showing a configuration of a linear network to which a SDH transmission mode is applied;

FIG. 10 is a block diagram showing an internal configuration of a terminal apparatus shown in FIG. 9;

DESCRIPTION OF THE PREFERRED EMBODIMENTS

Figure 1:
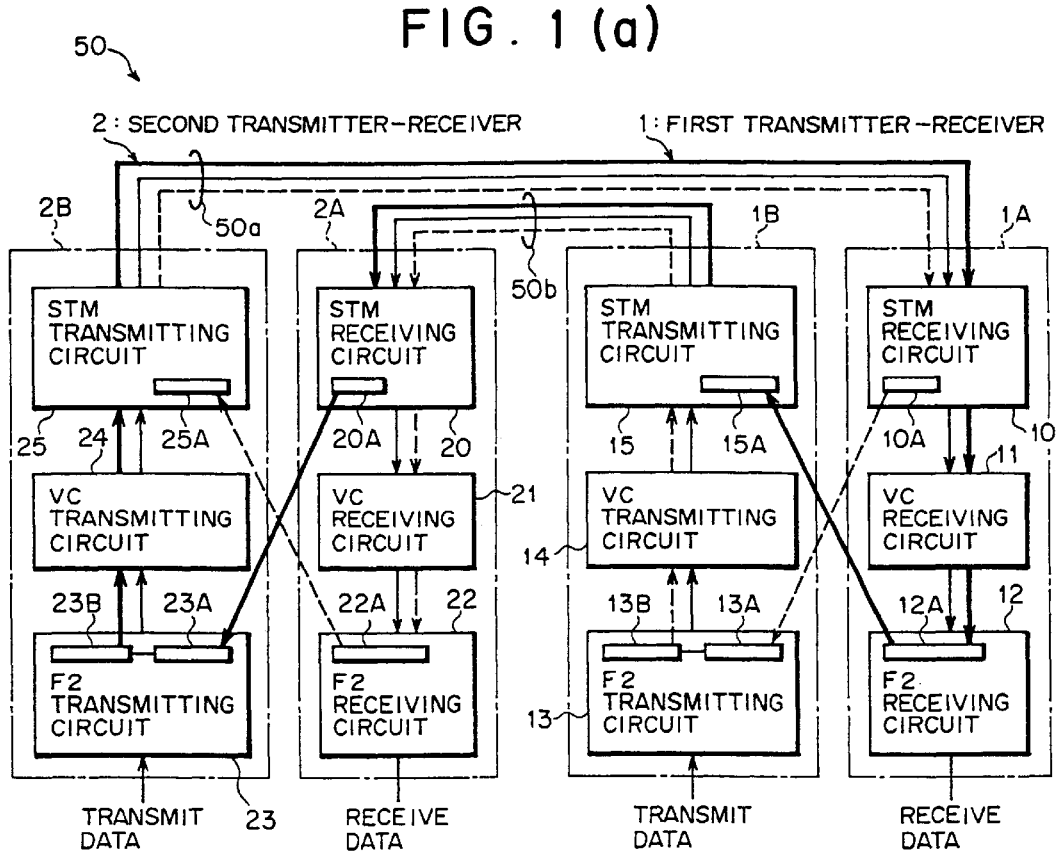
FIG. 1(a) is a block diagram showing a configuration of a pseudo-synchronization preventing SDH transmission system according to one embodiment of the present invention.
FIG. 1(b) is a diagram for explaining the operation of the system shown in FIG. 1(a)
Figure 1:
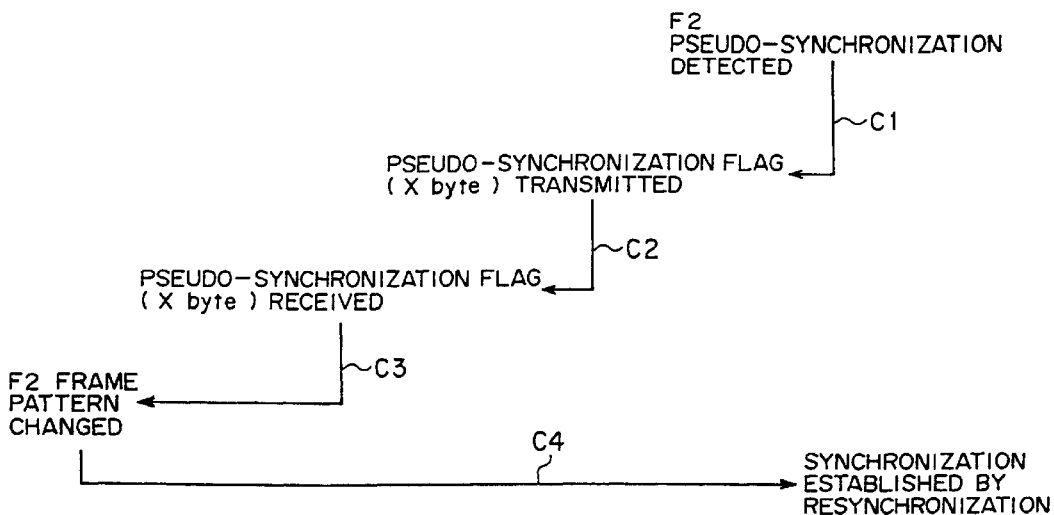

A description will now be given of an embodiment of the present invention referring to the accompanying drawings.

(a) Description of Network

FIG. 9 is a block diagram showing a configuration of a linear network to which an SDH transmission mode is applied. A linear network 100 shown in FIG. 9 is configured by connecting terminal apparatus 4, 6 through an optical fiber 100a. Repeaters (such as optical amplifier) 5a, 5b are mounted on the optical fiber 100a for the connection of the terminal apparatus 4, 6.

Further, exchanges 3a, 3b are mounted between the terminal apparatus 4 and terminals (users) 30, 31, and exchanges 7a, 7b are mounted between the terminal apparatus 6 and terminals (users) 70, 71. Moreover, the terminals 30, 31, 70, and 71 are equivalent to, for example, telephones in a public switched network.

Specifically, the above terminal apparatus 4, 6 respectively perform processing required to transmit and receive information from the terminals 30, 31, 70, and 71 according to the SDH transmission mode, and respectively include terminal interfaces 40, 60, cross connects 41, 61, and optical interfaces 42, 62.

Here, in the terminal apparatus 6, the optical interface (optical IF board) 62 carries out demultiplexing of an optical signal (STM frame) inputted through the optical fiber 100a, and carries out multiplexing of optical signals to be outputted through the optical fiber 100a.

Specifically, as shown in FIG. 10, in the demultiplexing, the optical interface 62 converts the optical signal inputted through the optical fiber 100a into an electric signal (O/E), and extracts a section overhead (SOH) having operational functions given to the signal, thereafter carrying out the demultiplexing (DMUX) of the STM frame depending upon the SOH.

Subsequently, after a pointer (PTR) is extracted from the demultiplexed STM frame, and a path overhead (POH) is extracted therefrom, the cross connect 61 performs the following switching depending upon the POH. Moreover, in order to extract the POH, the optical interface 62 extracts an F2 byte forming the POH to establish a data link between the terminal apparatus 4 and the terminal apparatus 6.

On the other hand, in the multiplexing, the optical interface 62 provides data from the cross connect 61 with a POH in which an F2 byte is inserted, and subsequently provides the data with a pointer (PTR), thereafter carrying out the multiplexing (MUX) of the two or more data provided with the pointer.

Subsequently, the optical interface 62 provides the multiplexed data with an SOH, and thereafter converts the data (electric signal) into an optical signal (E/O) to output the converted optical signal through the optical fiber 100a.

Besides, the cross connect (XC) 61 shown in FIG. 10 makes a line setting for transmission to a predetermined destination depending upon the POH given to the data (switching).

In addition, the terminal interface [PDH (Presiochronous Digital Hierarchy) IF board] 60 disassembles information of a VC layer from the cross connect 61 to provide information (containers) in minimum unit (demapping), while accommodating information (containers) sent from an exchange (not shown) to be multiplexed in a VC (providing with a POH) (mapping). Moreover, the terminal interface 60 is provided with IF boards having the number which corresponds to the number of installed exchanges to be connected (three IF boards in FIG. 10: see reference numerals 60a, 60b, and 60c).

Further, the optical interface 42, the cross connect 41, and the terminal interface 40 in the terminal apparatus 4 function as in the optical interface 62, the cross connect 61, and the terminal interface 60 which are described above, and detailed descriptions thereof are omitted.

As stated above, in the linear network 100 shown in FIG. 9, when the data from the terminals 30, 31 are inputted into the terminal apparatus 4 through the exchanges 3a, 3b, the terminal apparatus 4 processes the data through the mapping by the terminal interface 40, the switching by the cross connect 41, and the multiplexing by the optical interface 42, and inputs the data into the opposite terminal apparatus 6 through the optical fiber 100a. Moreover, the data are relayed by the repeaters 5a, 5b while being transmitted to the terminal apparatus 6.

Subsequently, the terminal apparatus 6 processes the data through the demultiplexing by the optical interface 62, the switching by the cross connect 61, and the demapping by the terminal interface 60, and transmits the data to the destination terminals 70, 71 through the exchanges 7a, 7b.

Meanwhile, though FIG. 9 shows the data transmission from the terminal apparatus 4 to the terminal apparatus 6, it is to be noted that a reverse transmission, that is, a data transmission from the terminal apparatus 6 to the terminal apparatus 4 is also available.

Further, in the above network 100, the data transmitted over the network 100 can be classified in a predetermined unit (logical layer) in accordance with the respective processing described above. Specifically, in the terminal apparatus 4, 6, the data processed in the terminal interfaces 40, 60 can be expressed as a layer called a PPI (PDH Physical Interface), which is a presiochronous Digital Hierarchy.

Besides, in the terminal apparatus 4, 6, the data processed in the cross connects 41, 61 can be expressed as layers called an MST (Multiplex Section Termination), an HPT (Higher Order Path Termination), and an LPT (Lower Order Path Termination).

In addition, the data processed in the optical interface 42 can be expressed as a layer called an RST (Regenerator Section Termination), and the data transmitted through the optical fiber 100a (between, for example, the terminal apparatus 4 and the repeater 5a, or the repeaters 5a and 5b) can be expressed as a layer called an SPI (SDH Physical interface).

Figure 11:
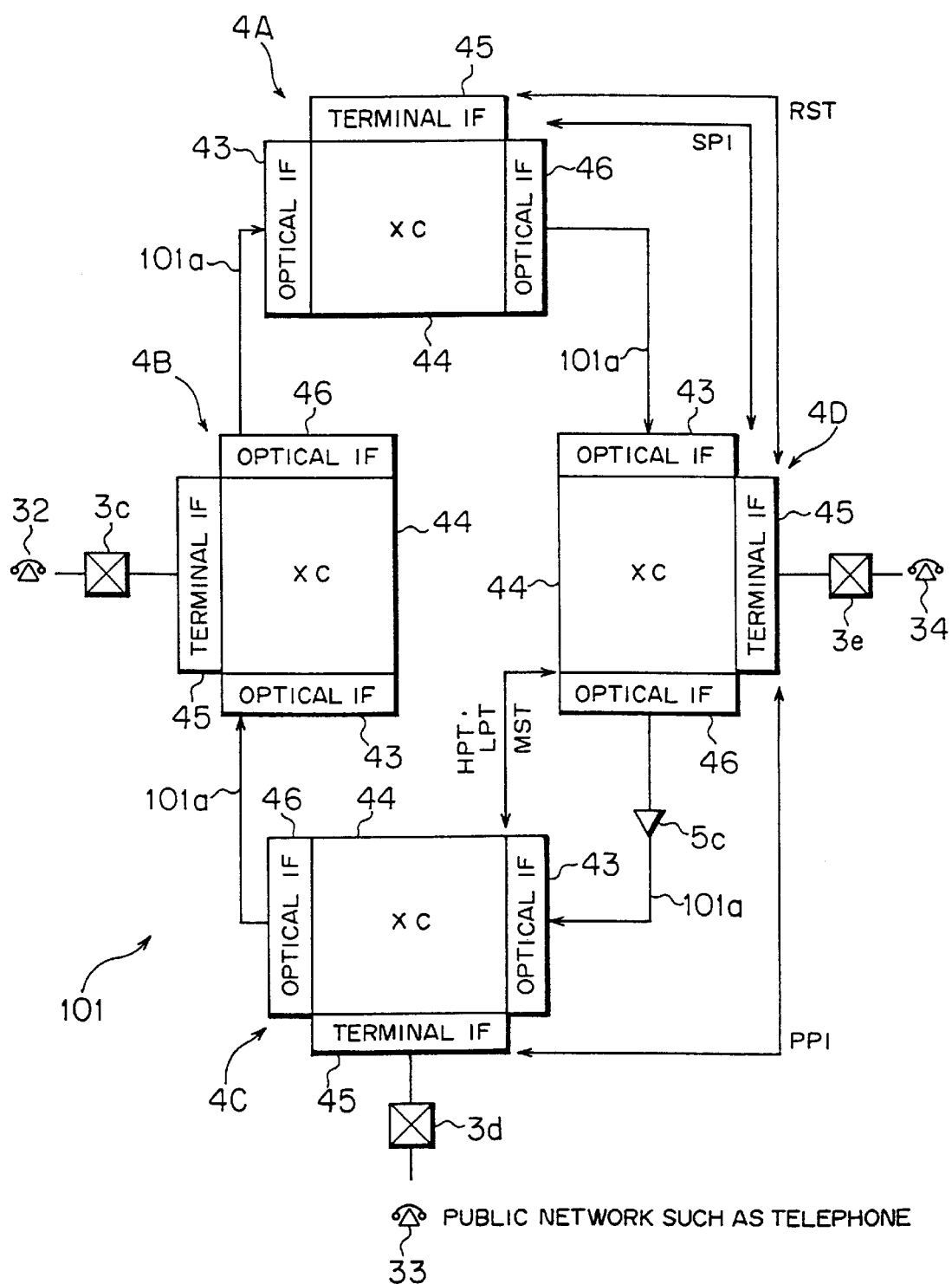
FIG. 11 is a block diagram showing a configuration of a ring network to which the SDH transmission mode is applied.

Next, FIG. 11 is a block diagram showing a configuration of a ring network to which the SDH transmission mode is applied. A ring network 101 shown in FIG. 11 is configured by interconnecting terminal apparatus 4A, 4B, 4C, and 4D through an optical fiber 101a. A repeater (such as optical amplifier) 5c is mounted at an appropriate position on the optical fiber 101a for the interconnection of the terminal apparatus. Further, in FIG. 11, the terminal apparatus 4B to 4D except the terminal apparatus 4A are respectively connected to terminals 32 to 34 through the exchanges 3c to 3e.

Specifically, as shown in FIG. 11, each of the terminal apparatus 4A to 4D includes optical interfaces 43, 46, a cross connect 44, and a terminal interface 45.

Figure 12:
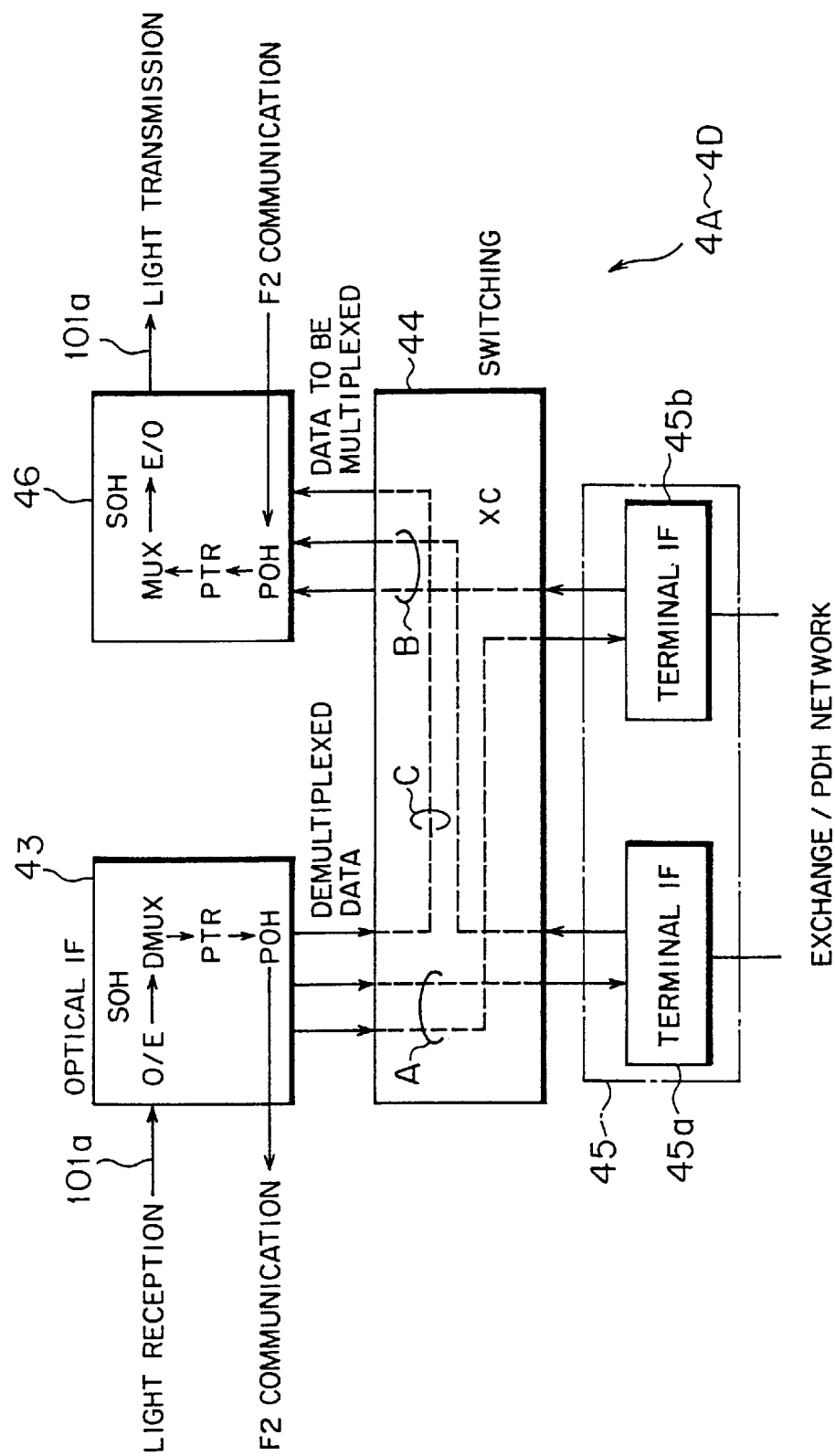
FIG. 12 is a block diagram showing an internal configuration of the terminal apparatus shown in FIG. 10.

Here, as shown in FIG. 12, the optical interface 43 carries out demultiplexing of an optical signal inputted through the optical fiber 101a, and the optical interface 46 carries out multiplexing of optical signals to be outputted through the optical fiber 101a. That is, the optical interfaces 43, 46 separately carry out the multiplexing and the demultiplexing which are carried out in the optical interface 62 of the linear network 100 shown in FIGS. 9 and 10.

Additionally, the cross connect 44 carries out switching of the signal demultiplexed in the optical interface 43 to transmit the signal to the terminal interface 45 described infra (see reference mark A in FIG. 12), and carries out switching of the signal from the terminal interface 45 to transmit the signal to the optical interface 46 (see reference mark B in FIG. 12). For example, when there is no exchange connected to the terminal interface 45 (see the terminal apparatus 4A shown in FIG. 11), the cross connect 44 passes the signal from the optical interface 43 therethrough, and transmits the signal to the optical interface 46 (see reference mark C in FIG. 12).

Further, the terminal interface 45 carries out mapping and demapping as in the terminal interface 60 described above, and is provided with IF boards having the number which corresponds to the number of installed exchanges (not shown) to be connected (two IF boards in FIG. 12: see reference numerals 45a, 45b). Moreover, the terminal interface 45 functions substantially as in the terminal interface 60 described above, and a detailed description thereof is omitted.

As stated above, in the ring network 101 shown in FIG. 11, for example, when data is inputted into the terminal apparatus 4B from the terminal apparatus 4C connected thereto through the optical fiber 101a, the terminal apparatus 4B carries out the demultiplexing, the switching, and the demapping as described above, and transmits data to the terminal 32 through the exchange 3c.

In addition, in a data transmission from the terminal apparatus 4B to the next terminal apparatus 4A, data is processed through the switching by the cross connect 44 and the multiplexing by the optical interface 46, and is transmitted to the terminal apparatus 4A through the optical fiber 101a.

In this case, since no exchange is connected to the terminal apparatus 4A, the cross connect 44 passes the data therethrough, and transmits the data to the subsequent terminal apparatus 4D.

Further, the data transmitted over the ring network 101 can also be expressed by a logical layer as in the above discussion. For example, the data processed in the terminal interface 45 can be expressed as the layer called the PPI, the data processed in the cross connect 44 can be expressed as the layers called the MST, the HPT, and the LPT, the data processed in the optical interface 43 (or 46) can be expressed as the layer called the RST, and the data transmitted through the optical fiber 101a can be expressed as the layer called the SPI.

(b) Description of Pseudo-Synchronization Preventing Mechanism

Meanwhile, by using the STM frame, the data is brought into synchronization to be transmitted over the respective networks 100, 101 stated above. However, as set forth above, in the system to which the SDH transmission mode is applied, the synchronization is established by allocating the predetermined synchronization pattern to the byte information in the STM frame. Hence, data having the same synchronization pattern as the predetermined synchronization pattern may exist in a signal with an interval identical with that of the predetermined synchronization pattern, resulting in possibility of pseudo-synchronization.

Hence, in a method of detecting the pseudo-synchronization according to the present invention, as described above, the terminal apparatus 4, 6, and 4A to 4D are respectively provided with the two counters, and the counters are used to detect the synchronization pattern of the input data (F2 byte) so as to detect the pseudo-synchronization depending upon a state of the detected synchronization pattern.

Specifically, the above-mentioned two counters include one true counter to count timing of the synchronization pattern of the input F2 byte, and a pseudo-counter to count timing of the same synchronization pattern as that of the true counter with phases mutually shifted. As will be described infra, when the synchronization pattern is detected in both the counters, it is decided that the pseudo-synchronization is established.

According to the present invention, when the pseudo-synchronization is detected as described above, information to the effect that the pseudo-synchronization is detected is transmitted to an opposite terminal apparatus by using an unused byte in byte information forming an overhead in an STM frame.

Figure 13:
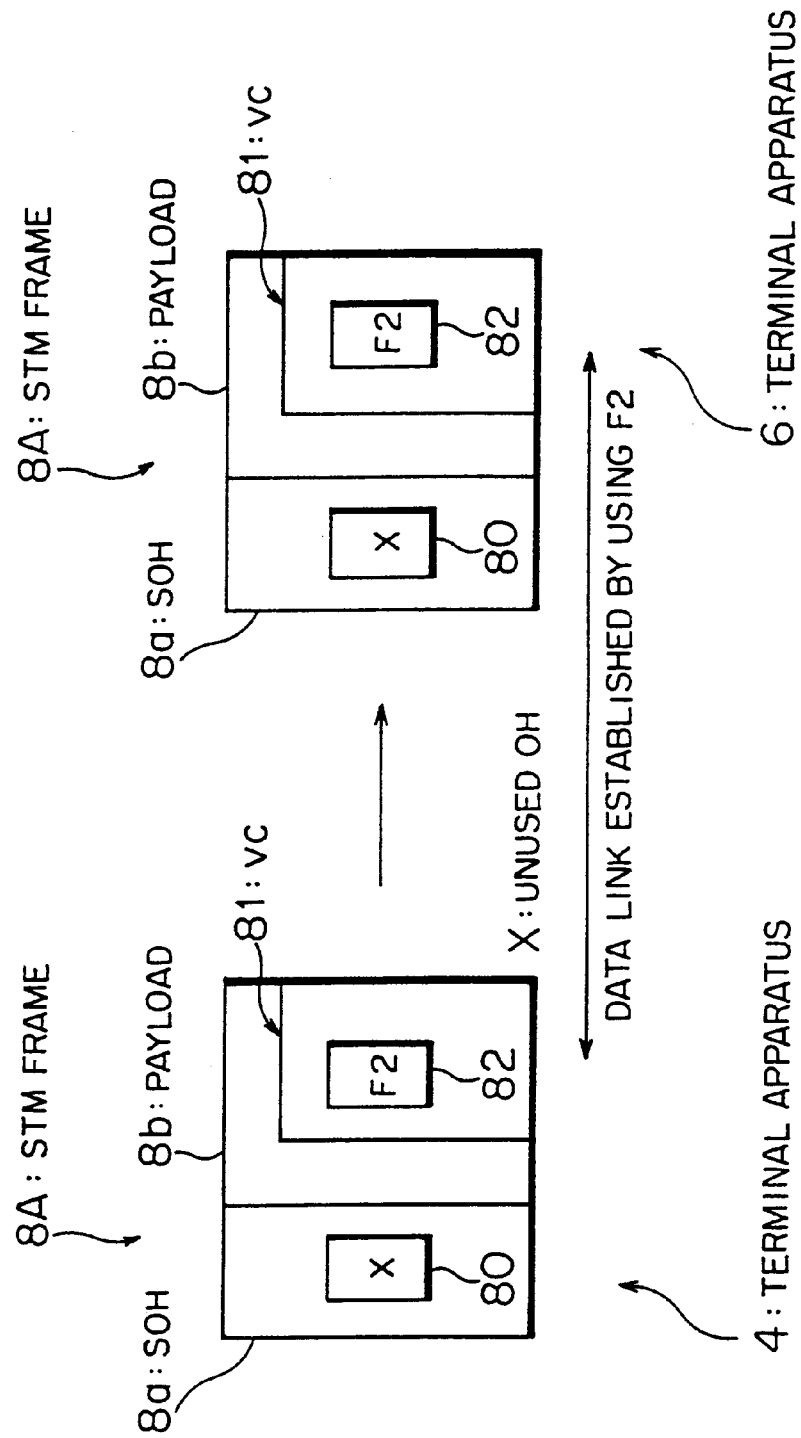
FIG. 13 is a block diagram showing one illustrative STM frame.

For example, as shown in FIG. 13, data (STM frame 8A) transmitted from the terminal apparatus 4 to the terminal apparatus 6 includes a section overhead (SOH) 8a and a payload 8b as set forth above. A predetermined synchronization pattern serving as synchronization pattern information is inserted into an F2 byte 82 of a virtual container (VC) 81 forming the payload 8b, thereby establishing a data link between the terminal apparatus 4 and the terminal apparatus 6.

Subsequently, depending upon the synchronization pattern information, when, for example, the terminal apparatus 4 detects the pseudo-synchronization, the terminal apparatus 4 transmits to the opposite terminal apparatus 6 a message (pseudo-synchronization posting information) to the effect that a pseudo-synchronization state is established by using an X byte 80 serving as an unused byte in the byte information forming the SOH 8a.

Further, when the terminal apparatus 6 receives the message to the effect that the pseudo-synchronization state is established, the terminal apparatus 6 changes the synchronization pattern by which the link is established between the apparatus, and inserts the changed synchronization pattern in the F2 byte so as to retransmit the result to the terminal apparatus 4.

As seen from the above discussion, in the data transmission between the terminal apparatus 4 and the terminal apparatus 6, each of the terminal apparatus recognizes the head of data by using the F2 byte, and when the pseudo-synchronization is detected, posts a message to this effect to the opposite apparatus by using an SOH of a layer higher than the layer of the F2 byte. It is thereby possible to rapidly transmit the message to the effect that the pseudo-synchronization state is established. When the terminal apparatus receives the message to the effect that the pseudo-synchronization state is established, the receiving terminal apparatus changes the synchronization pattern by which the link is established between the apparatus. Thus, no pseudo-synchronization pattern is detected so that the pseudo-synchronization can be prevented.

(c) Description of One Embodiment of the Invention

FIG. 1(a) is a block diagram showing a configuration of a pseudo-synchronization preventing SDH transmission system according to one embodiment of the present invention. A pseudo-synchronization preventing SDH transmission system 50 shown in FIG. 1(a) includes a first transmitter-receiver 1 and a second transmitter-receiver 2 which are opposed to each other. In the first transmitter-receiver 1 and the second transmitter-receiver 2, a data transmission is made according to an SDH transmission mode by using an F2 byte (predetermined byte information) in a VC path in an STM frame.

Moreover, the pseudo-synchronization preventing SDH transmission system 50 is equivalent to the optical interfaces 42, 62 (see FIG. 9) in the above-mentioned linear network 100.

Specifically, the first transmitter-receiver 1 includes a receiving unit 1A and a transmitting unit 1B. The receiving unit 1A receives data transmitted from the second transmitter-receiver 2 through an optical fiber 50a, and includes an STM receiving circuit 10, a VC receiving circuit 11, and an F2 receiving circuit 12.

Here, the STM receiving circuit (STM frame receiving apparatus) 10 makes a reception in a layer of the STM frame, and terminates an SOH (section overhead) of the STM frame transmitted from the second transmitter-receiver 2 so as to disassemble the STM frame. Further, the STM receiving circuit 10 is provided with a pseudo-synchronization posting information receiving unit 10A. A detailed description will later be given of the pseudo-synchronization posting information receiving unit 10A.

Further, the VC receiving circuit 11 terminates a VC in the STM frame transmitted from the STM receiving circuit 10. The F2 receiving circuit (byte information receiving apparatus) 12 is connected to the STM receiving circuit 10 to receive an F2 byte (see FIG. 13) in a VC path of an order lower than that of the above STM frame, and includes a pseudo-synchronization detecting unit 12A.

Specifically, the pseudo-synchronization detecting unit 12A finds the same pattern as the synchronization pattern in the F2 byte in the VC path in the STM frame received through the STM receiving circuit 10, thereby detecting that the pseudo-synchronization state is established.

Besides, the transmitting unit 1B shown in FIG. 1(a) transmits data to the second transmitter-receiver 2 through the optical fiber 50b, and includes an F2 transmitting circuit 13, a VC transmitting circuit 14, and an STM transmitting circuit 15.

Here, the F2 transmitting circuit (byte information transmitting apparatus) 13 transmits byte information of the same layer as that of the F2 byte described above, and includes a synchronization pattern changing unit 13A and a changed synchronization pattern transmitting unit 13B. Detailed descriptions will later be given of the synchronization pattern changing unit 13A and the changed synchronization pattern transmitting unit 13B.

Further, the VC transmitting circuit 14 provides a pointer for information of the layer containing the F2 byte from the F2 transmitting circuit 13. In addition, the STM transmitting circuit (STM frame transmitting apparatus) 15 is connected to the F2 transmitting circuit 13 through the VC transmitting circuit 14 so as to make a transmission in the layer of the STM frame, and includes a pseudo-synchronization posting unit 15A.

Specifically, when the above-mentioned pseudo-synchronization detecting unit 12A detects the establishment of the pseudo-synchronization state, the pseudo-synchronization posting unit 15A inserts information to the effect that the pseudo-synchronization state is established in the overhead [that is, the X byte (see FIG. 13)] of the STM frame, and posts the information to the opposite second transmitter-receiver 2.

That is, when data transmitted from the opposite second transmitter-receiver 2 is put in the pseudo-synchronization state, the first transmitter-receiver 1 detects the state by the F2 receiving circuit 12 of the receiving unit 1A to directly post the message to this effect to the STM transmitting circuit 15 serving as a last output stage of the transmitting unit 1B (that is, post without passing the information through the F2 transmitting circuit 13 and the VC transmitting circuit 14), thereafter outputting the message from the pseudo-synchronization posting unit 15A of the STM transmitting circuit 15 to the second transmitter-receiver 2.

Next, the second transmitter-receiver 2 shown in FIG. 1(*a*) includes a receiving unit 2A and a transmitting unit 2B. The receiving unit 2A and the transmitting unit 2B respectively function as in the receiving unit 1A and the transmitting unit 1B forming the first transmitter-receiver 1 described above.

Accordingly, an STM receiving circuit 20, a VC receiving circuit 21, and an F2 receiving circuit 22 in the receiving unit 2A respectively function as in the STM receiving circuit 10, the VC receiving circuit 11, and the F2 receiving circuit 12 in the receiving unit 1A. Further, an F2 transmitting circuit 23, a VC transmitting circuit 24, and an STM transmitting circuit 25 in the transmitting unit 2B respectively function as in the F2 transmitting circuit 13, the VC transmitting circuit 14, and the STM transmitting circuit 15 in the transmitting unit 1B.

Here, in the above-mentioned receiving unit 2A, a pseudo-synchronization posting information receiving unit 20A receives information to the effect that the pseudo-synchronization state is established, posted from the pseudo-synchronization posting unit 15A of the first transmitter-receiver 1. Specifically, when data transmitted from the own apparatus 2 is put in the pseudo-synchronization state in the first transmitter-receiver 1, the pseudo-synchronization state is detected by the pseudo-synchronization detecting unit 12A of the first transmitter-receiver 1 to be posted to the pseudo-synchronization posting information receiving unit 20A through the pseudo-synchronization posting unit 15A.

In addition, in the transmitting unit 2B, the synchronization pattern changing unit 23A makes a change of a synchronization pattern into an additional synchronization pattern different from the synchronization pattern in the F2 byte. That is, when the pseudo-synchronization posting information receiving unit 20A receives the information to the effect that the pseudo-synchronization state is established, the synchronization pattern changing unit 23A changes the synchronization pattern at the time of reception into the additional synchronization pattern.

Further, a changed synchronization pattern transmitting unit 23B transmits the synchronization pattern obtained by the change in the synchronization pattern changing unit 23A to the first transmitter-receiver 1, i.e., the F2 receiving circuit 12 of the receiving unit 1A in the first transmitter-receiver 1 through the VC transmitting circuit 24 and the STM transmitting circuit 25.

That is, when the pseudo-synchronization state is detected in the opposite first transmitter-receiver 1, the second transmitter-receiver 2 changes the synchronization pattern in response to the posted information.

In other words, when pseudo-synchronization occurs in the data received in the first transmitter-receiver 1, recovery processing is performed by a route [see the thicker solid line arrow in FIG. 1(*a*)] extending in the order of the pseudo-synchronization detecting unit 12A, the pseudo-synchronization posting unit 15A, the pseudo-synchronization posting information receiving unit 20A, the synchronization pattern changing unit 23A, the changed synchronization pattern transmitting unit 23B, and the pseudo-synchronization detecting unit 12A.

On the other hand, in the second transmitter-receiver 2, the pseudo-synchronization detecting unit 22A in the receiving unit 2A finds the same pattern as the synchronization pattern in the F2 byte in the VC path in the STM frame which is transmitted from the first transmitter-receiver 1 and is received through the STM receiving circuit 20, thereby detecting that the pseudo-synchronization state is established.

That is, the pseudo-synchronization detecting unit 22A in the second transmitter-receiver 2 performs substantially the same processing as those in the pseudo-synchronization detecting unit 12A in the first transmitter-receiver 1 in the above discussion.

Further, when the pseudo-synchronization detecting unit 22A detects that the pseudo-synchronization state is established, the pseudo-synchronization posting unit 25A in the transmitting unit 2B inserts information to the effect that the pseudo-synchronization state is established in an overhead of an STM frame, and posts the pseudo-synchronization state to the STM receiving circuit 10 in the first transmitter-receiver 1.

That is, in the second transmitter-receiver 2, when the data transmitted from the first transmitter-receiver 1 is put in the pseudo-synchronization state, the pseudo-synchronization detecting unit 22A of the receiving unit 2A detects the state, and the pseudo-synchronization posting unit 25A in the transmitting unit 2B outputs the information to this effect. The information is received in the pseudo-synchronization posting information receiving unit 10A in the first transmitter-receiver 1.

Specifically, the pseudo-synchronization posting information receiving unit 10A in the first transmitter-receiver 1 receives the information to the effect that the pseudo-synchronization state is established, posted from the pseudo-synchronization posting unit 25A in the second transmitter-receiver 2. The pseudo-synchronization posting information receiving unit 10A in the first transmitter-receiver 1 performs substantially the same processing as those in the pseudo-synchronization posting information receiving unit 20A in the second transmitter-receiver 2 in the above discussion.

Additionally, in the first transmitter-receiver 1, the synchronization pattern changing unit 13A and the changed synchronization pattern transmitting unit 13B in the transmitting unit 1B function substantially as in the synchronization pattern changing unit 23A and the changed synchronization pattern transmitting unit 23B described above. When the pseudo-synchronization posting information receiving unit 10A receives the information to the effect that the pseudo-synchronization state is established, the synchronization pattern changing unit 13A changes the synchronization pattern in the F2 byte into an additional synchronization pattern different from the synchronization pattern, and the changed synchronization pattern transmitting unit 13B transmits the changed synchronization pattern to the second transmitter-receiver 2.

That is, when the pseudo-synchronization state is detected in the opposite second transmitter-receiver 2, the first transmitter-receiver 1 changes the synchronization pattern in response to the posted information.

In other words, when pseudo-synchronization occurs in the data received in the second transmitter-receiver 2, recovery processing is performed by a route [see the dotted line arrow in FIG. 1(*a*)] extending in the order of the pseudo-synchronization detecting unit 22A, the pseudo-synchronization posting unit 25A, the pseudo-synchronization posting information receiving unit 10A, the synchronization pattern changing unit 13A, the changed synchronization pattern transmitting unit 13B, and the pseudo-synchronization detecting unit 22A.

Figure 2:
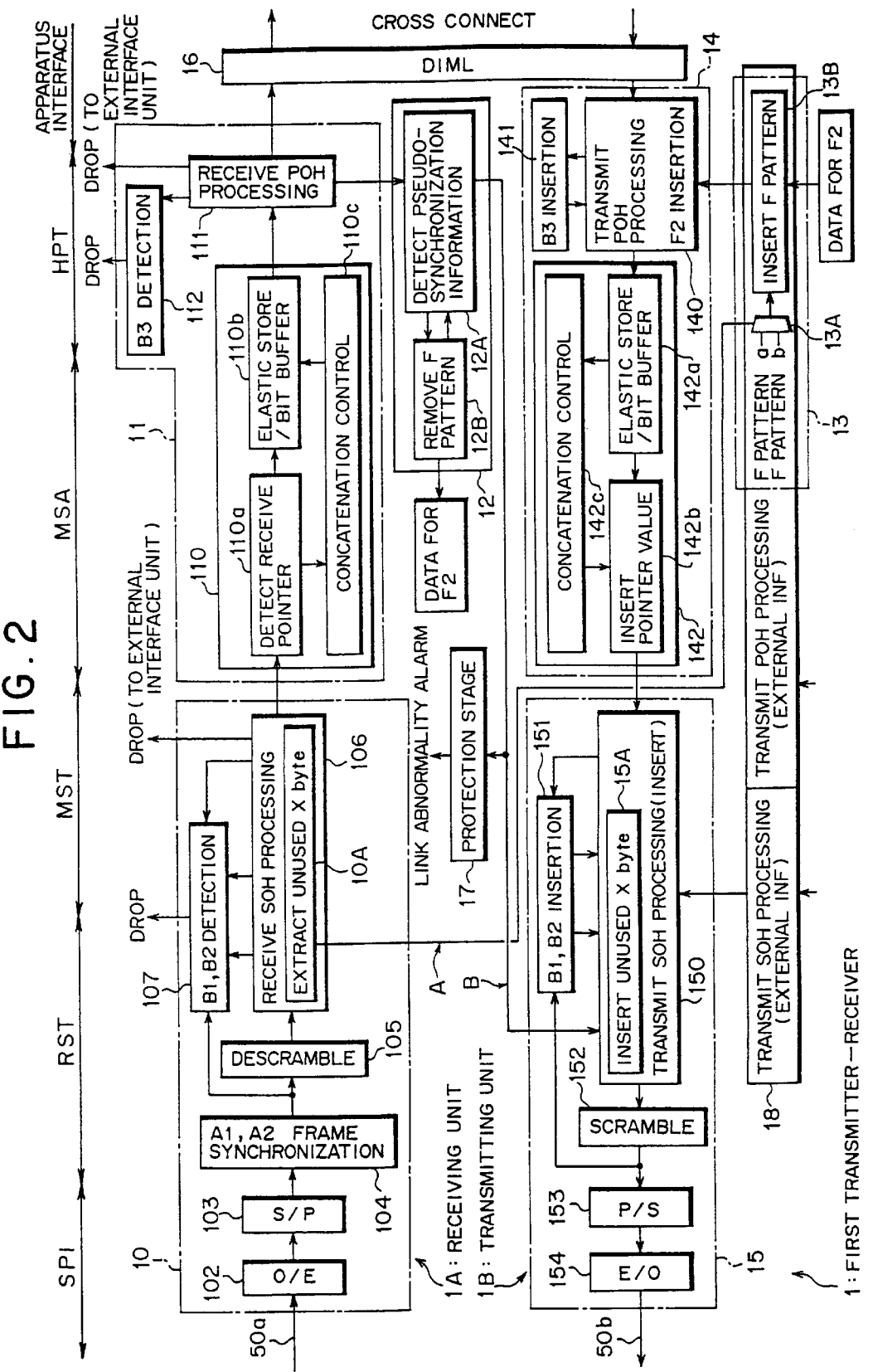
FIG. 2 is a block diagram showing a detailed configuration of a first transmitter-receiver and its periphery according to one embodiment of the present invention.

FIG. 2 is a block diagram showing a detailed configuration of the first transmitter-receiver 1 and its periphery.

Specifically, as shown in FIG. 2, the above-mentioned STM receiving circuit 10 includes an opt electro converter 102, a serial/parallel converter 103, a frame synchronization detecting unit 104, a descramble processing unit 105, a receive section overhead processing unit 106, and an error detecting unit 107.

Here, the opt electro converter (O/E) 102 converts an input optical signal into an electric signal, the serial/parallel converter (S/P) 103 carries out speed conversion of input serial data into parallel data, and the frame synchronization detecting unit 104 detects whether or not an input STM frame is in synchronization. The frame synchronization detecting unit 104 detects a synchronization state of the STM frame depending upon A1 and A2 bytes of a regenerator section overhead (RSOH) forming a section overhead (SOH).

In addition, the descramble processing unit 105 performs descramble processing of data from the frame synchronization detecting unit 104, and the receive section overhead processing unit 106 extracts the SOH given to the input signal. Specifically, the receive section overhead processing unit 106 extracts a B1 byte from the RSOH of the SOH depending upon a signal before the processing in the descramble processing unit 105 described above, and extracts a B2 byte from a multiplex section overhead (MSOH) of the SOH depending upon a signal obtained by predetermined arithmetic processing in the receive SOH processing unit 106, thereby outputting these byte information to the error detecting unit 107 described infra.

Subsequently, the error detecting unit 107 detects whether or not an error occurs in the input signal depending upon these byte information.

Further, the receive SOH processing unit 106 extracts K1 and K2 bytes from the MSOH of the SOH to output these byte information to an external interface unit (not shown). Specifically, the K1 and K2 bytes are used by the external interface unit to supervise a state between the first transmitter-receiver 1 and the second transmitter-receiver 2. Then, demultiplexing is carried out depending upon these byte information.

Additionally, the receive SOH processing unit 106 is provided with the pseudo-synchronization posting information receiving unit 10A described above referring to FIG. 1(a). As set forth above, the pseudo-synchronization posting information receiving unit 10A extracts information to the effect that the pseudo-synchronization state is established from the X byte of the SOH posted from the corresponding second transmitter-receiver 2, and functions as, for example, an OH (overhead) extracting circuit as shown in FIG. 4.

Figure 4:
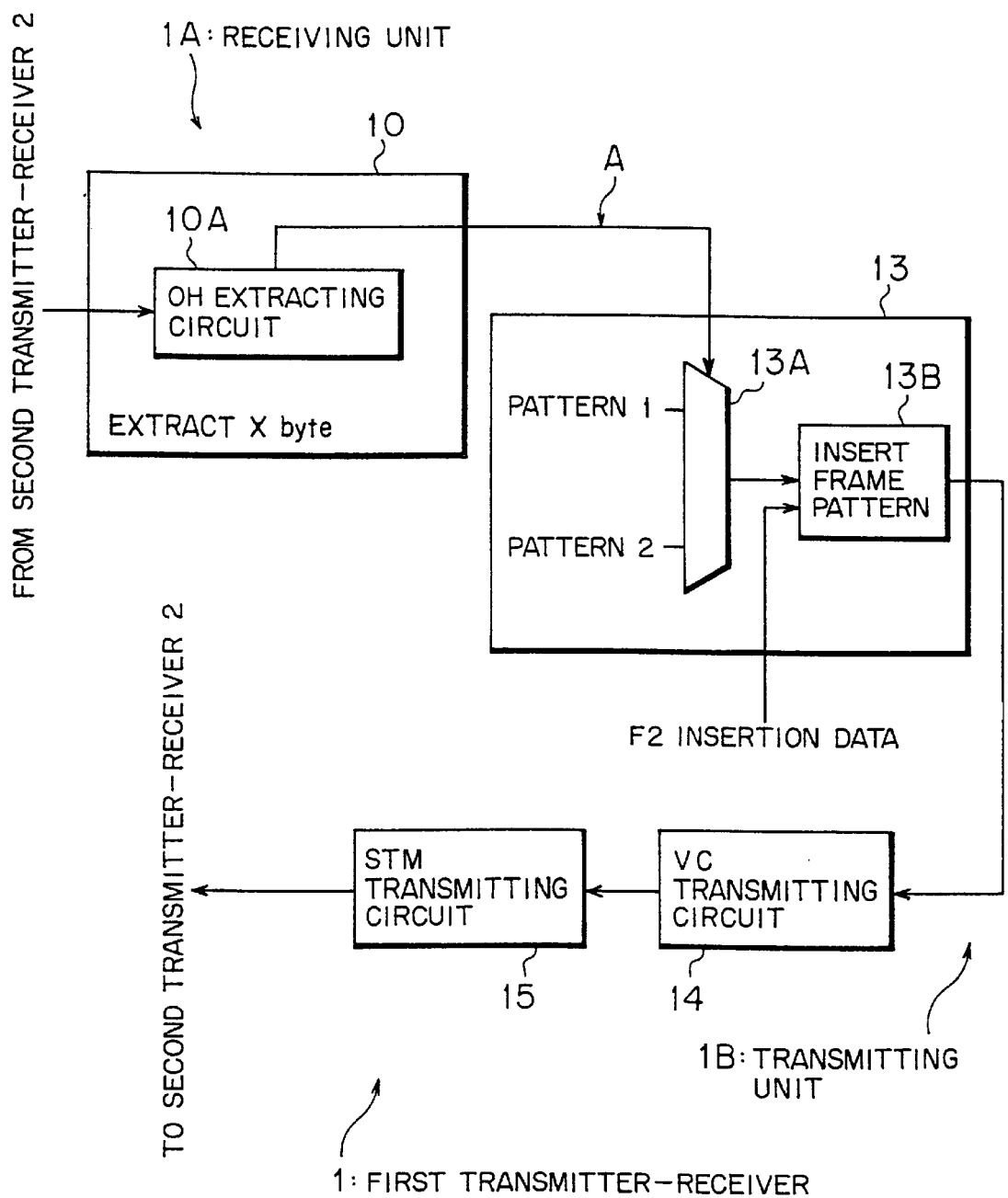
FIG. 4 is a block diagram showing a synchronization pattern changing system according to one embodiment of the present invention.

The extracted X byte bypasses the VC receiving circuit 11 and the F2 receiving circuit 12, and is directly transmitted to the F2 transmitting circuit 13 in the transmitting unit 1B (see the arrow A in FIGS. 2 and 4).

Next, the VC receiving circuit 11 shown in FIG. 2 includes a receive pointer processing unit 110, a receive path overhead processing unit 111, and a path error detecting unit 112.

Here, the receive pointer processing unit 110 performs receive pointer processing of the input signal, and includes a receive pointer detecting unit 110a, an elastic store/bit buffer 110b, and a concatenation control unit 110c.

Specifically, the receive pointer detecting unit 110a extracts a pointer byte and a concatenation indication signal from a signal sent from the STM receiving circuit 10, and the concatenation control unit 110c makes a control, according to a line size (type) setting (concatenation setting) externally fixedly set, depending upon state transitions corresponding to an initial channel and a tributary channel for each channel of the input signal, i.e., depending upon the concatenation indication signal extracted in the receive pointer detecting unit 110a.

Further, the elastic store/bit buffer 110b holds the input signal depending upon the extracted pointer byte, and carries out transposition from clock timing of the held input signal to clock timing of an apparatus (such as cross connect) depending upon a control signal from the concatenation control unit 110c.

In addition, the receive path overhead processing unit 111 extracts the POH given to the input signal to output a B3 byte in the extracted POH to the path error detecting unit 112 described infra, and output other byte information to the external interface unit (not shown).

The path error detecting unit 112 receives the B3 byte from the receive path overhead processing unit 111, and detects depending upon the B3 byte whether or not an error occurs in a path of the input signal. Further, the byte information other than the B3 byte are used as other supervision information in the external interface unit.

Figure 3:
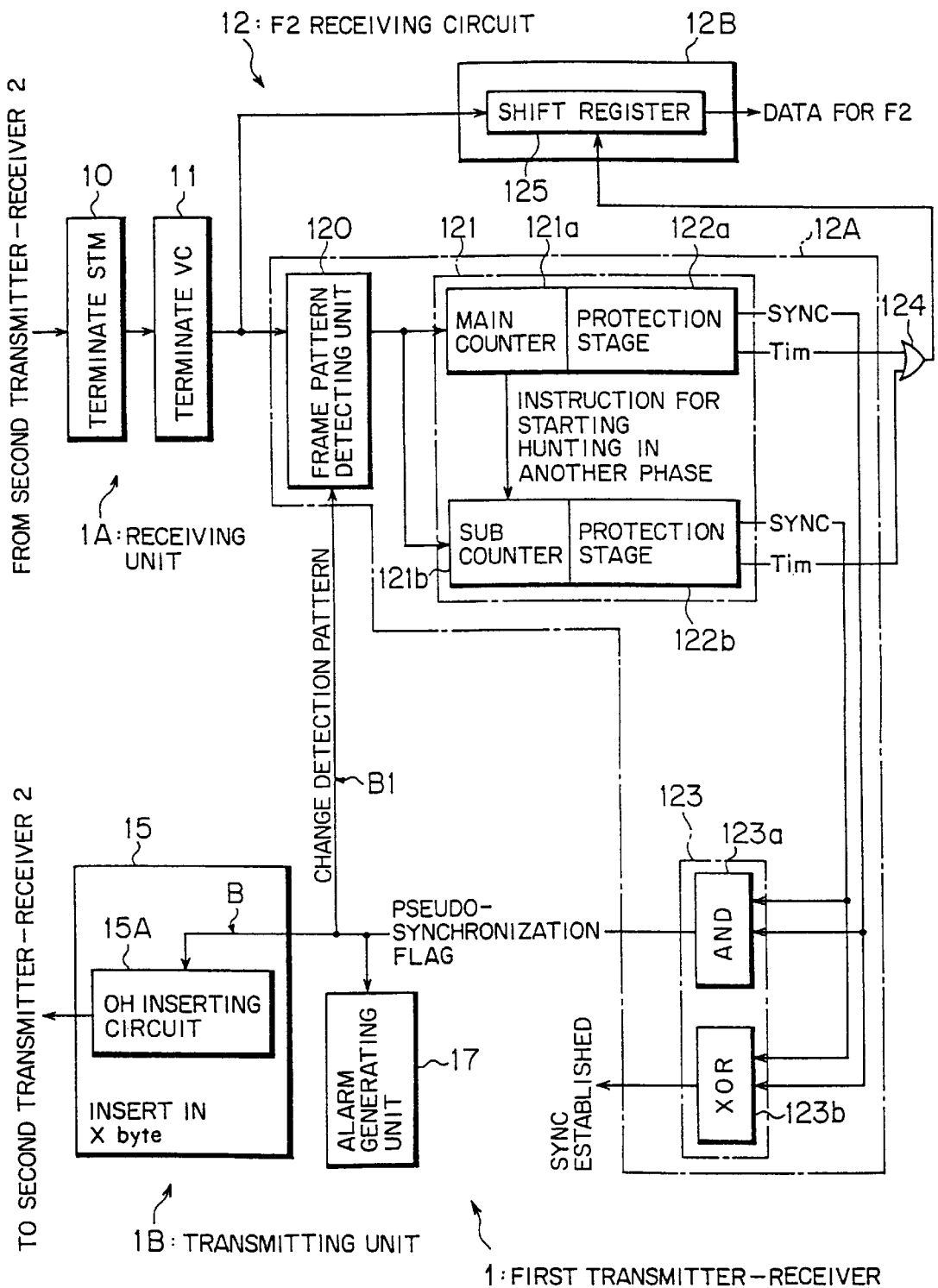
FIG. 3 is a block diagram showing a system for detecting pseudo-synchronization posting information according to one embodiment of the present invention.

In addition, the F2 receiving circuit 12 includes the pseudo-synchronization detecting unit 12A and a frame pattern removing unit 12B. As shown in FIG. 3, the pseudo-synchronization detecting unit 12A includes, for example, a frame pattern detecting unit 120, a counter 121, and an arithmetic logic unit 123.

Here, the frame pattern detecting unit 120 detects a synchronization pattern of the F2 byte from the VC receiving circuit 11, and has a detection pattern corresponding to the synchronization pattern of the above F2 byte. Further, the counter 121 detects the synchronization pattern of the F2 byte or the same pattern as the synchronization pattern with phases mutually shifted. The counter 121 includes a main counter 121a and a subcounter 121b.

Specifically, the above-mentioned main counter 121a counts the synchronization pattern of data of the F2 byte, and the subcounter 121b counts the same synchronization pattern as the synchronization pattern counted in the main counter 121a, and starts the counting (hunting) from a position different from timing counted in the main counter 121a (another phase).

Further, the counters 121a, 121b are provided with protection stages 122a, 122b to make a decision as to whether or not the synchronization patterns counted in the counters 121a, 121b are accurate. The decision is made depending upon the number of forward protection stages and the number of backward protection stages, both of which are preset.

For example, when two forward protection stages and a single backward stage are preset in the protection stages 122a, 122b, two detections of the synchronization pattern causes the protection stages 122a, 122b to output synchronization information (SYNC) depending upon a decision in that synchronization is established. On the other hand, at a time of only one detection of the synchronization pattern, the protection stages 122a, 122b continue the hunting by the counters 121a, 121b depending upon a decision in that synchronization is lost.

Further, in the protection stages 122a, 122b, at a time of the decision in that the synchronization is established, the synchronization information (SYNC) is outputted to the arithmetic logic unit 123 described infra, and timing information (Tim: trigger signal) is concurrently outputted to the under mentioned frame pattern removing unit 12B through an OR circuit 124. Moreover, when it is decided in the above protection stages 122a, 122b that the synchronization is lost, the synchronization information and the timing information are not outputted.

In addition, the arithmetic logic unit 123 shown in FIG. 3 makes a decision as to whether or not a pseudo-synchronization state is established by performing logical operation depending upon results of pattern detection in the counters 121a, 121b, and includes an AND circuit 123a and an EXCLUSIVE-OR circuit 123b.

Here, the AND circuit 123a receives two synchronization information from the above protection stages 122a, 122b, and outputs pseudo-synchronization posting information depending thereon. When two input terminals are set to "1," a pseudo-synchronization flag is set (to "1"). That is, when both the main counter 121a and the subcounter 121b are in synchronization, the AND circuit 123a posts to the second transmitter-receiver 2 a message to the effect that the pseudo-synchronization state is established.

Additionally, the pseudo-synchronization flag outputted in the F2 receiving circuit 12 bypasses the F2 transmitting circuit 13 and VC transmitting circuit 14 in transmitting unit 1B, and is directly transmitted to the STM transmitting circuit 15 (see the arrow B in FIGS. 2 and 3). In the OH inserting circuit (pseudo-synchronization posting unit) 15A of the STM transmitting circuit 15, the pseudo-synchronization flag (pseudo-synchronization posting information) is inserted in the X byte of the SOH to be transmitted to the second transmitter-receiver 2.

At the same time, the message to the effect that the pseudo-synchronization state is established is also posted to the frame pattern detecting unit 120, thereby changing the detection pattern held in the frame pattern detecting unit 120 (see the arrow B1 in FIG. 3). That is, as set forth above, when the message to the effect that the pseudo-synchronization state is established is posted to the second transmitter-receiver 2, the transmitting unit 2B in the second transmitter-receiver 2 changes and outputs a synchronization pattern of data of an F2 byte to be subsequently transmitted. Hence, a message (detection pattern changing information) to the effect that the synchronization pattern from the transmitting unit 2B is changed is also posted to the receiving unit 1A (frame pattern detecting unit 120) of the own apparatus 1.

Moreover, the above detection pattern changing information is posted to the frame pattern detecting unit 120 at a transition point from the state (pseudo-synchronization state) in which the two counters 121a, 121b are respectively in synchronization to another state in which any one of the two counters 121a, 121b exits from the above pseudo-synchronization state.

Besides, the EXCLUSIVE-OR circuit (XOR) 123b receives two synchronization information from the above protection stages 122a, 122b, and outputs synchronization establishment information depending thereon. When any one of data inputted into two input terminals is set to "1," a synchronization establishment flag is set (to "1") That is, when any one of the main counter 121a and the subcounter 121b is in synchronization, the EXCLUSIVE-OR circuit 123b posts a message to the effect that the synchronization is established.

That is, the main counter 121a does not always count a true synchronization pattern among the synchronization patterns of the input data so that the main counter 121a may count a pseudo-synchronization pattern identical with the true synchronization pattern. In such a case, the subcounter 121b counts the true synchronization pattern.

Therefore, the XOR 123b can make the decision that the synchronization is established as long as any one of the main counter 121a and the subcounter 121b is in synchronization.

Additionally, the frame pattern removing unit 12B shown in FIG. 3 removes a frame bit of the synchronization pattern from the data of the F2 byte depending upon timing information outputted from the above protection stages 122a, 122b, and includes, for example, a shift register 125.

Specifically, when the synchronization of the F2 byte is established, the timing information outputted from the protection stages 122a, 122b are ORed by the OR circuit 124, and depending upon the resultant data, the shift register 125 extracts the frame bit of the synchronization pattern from the data of the F2 byte transmitted from the VC receiving circuit 11.

That is, as shown in FIG. 5(a), the above extracted F2 byte includes one frame containing, for example, 8-bit data (D1 to D8) and 2-bit frame bit (Fa, Fb). The above shift register 125 can extract the 8-bit data or any data therein as data for the F2 depending upon the timing information obtained through the OR circuit 124.

As stated above, the above F2 receiving circuit 12 includes the two counters 121a, 121b, and is capable of establishing the frame synchronization in response to the receive signal by itself. Consequently, it is possible to carry out predetermined count processing of any type of input signal such as signal sequence with a high error rate, or signal requiring fixed signaling.

The F2 transmitting circuit (byte information transmitting apparatus) 13 shown in FIG. 2 includes the synchronization pattern changing unit 13A, and the frame pattern inserting unit (changed synchronization pattern transmitting unit) 13B. As set forth above, when the STM receiving circuit 10 (pseudo-synchronization posting information receiving unit 10A) receives the pseudo-synchronization posting information from the second transmitter-receiver 2, the information bypasses the VC receiving circuit 11 and the F2 receiving circuit 12 (see the arrow A in FIG. 2), and is posted to the F2 transmitting circuit 13 (synchronization pattern changing unit 13A).

Specifically, as shown in FIG. 4, the synchronization pattern changing unit 13A changes any one (first synchronization pattern) of the two synchronization patterns into another synchronization pattern (second synchronization pattern) depending upon the X byte extracted by the pseudo-synchronization posting information receiving unit 10A (see the arrow A in FIG. 4).

For example, as shown in FIG. 5(a), when the synchronization pattern of the input F2 byte has a 2-bit frame bit containing Fa and Fb, the synchronization pattern changing unit 13A receives the pseudo-synchronization posting information to change the frame bit having a frame pattern of Fa and Fb into a different frame bit (having a different frame pattern of, for example, Fb and Fa) [see FIG. 5(b)].

As seen from the above discussion, in the F2 transmitting circuit 13, the synchronization pattern changing unit 13A transmits to the frame pattern inserting unit 13B in the next stage any one of the two synchronization patterns corresponding to the synchronization state of the receive data, and the frame pattern inserting unit 13B inserts the data of the F2 byte, and transmits the F2 byte data and the above synchronization pattern to the VC transmitting circuit 14.

Moreover, though the 2 bits are used as the frame bit in the illustration, it is to be noted that the number of bits may be varied according to quality of data to be transmitted, and two or more bits may be used. However, when the F2 byte is used, an increase in the number of bits used as the frame bit decreases the number of bits used as transmit data (D1 to D8). Hence, in this case, the 2 bits are preferably used for the frame bit.

Further, as shown in FIG. 2, the VC transmitting circuit 14 includes a transmit path overhead processing unit 140, a path error information inserting unit 141, and a transmit pointer processing unit 142.

Here, the path error information inserting unit 141 inserts a B3 byte of a POH, and the B3 byte can be used to detect whether or not an error occurs in a path. The transmit path overhead processing unit 140 inserts the POH in output data, that is, inserts therein the B3 byte from the above path error information inserting unit 141 and the F2 byte from the above frame pattern inserting unit 13B.

Further, the transmit pointer processing unit 142 performs transmit pointer processing of the output data, and includes an elastic store/bit buffer 142a, a pointer value inserting unit 142b, and a concatenation control unit 142c.

The elastic store/bit buffer 142a carries out transposition from clock timing of a signal from the transmit POH processing unit 140 (the clock timing of the apparatus) to clock timing of an output signal. Substantially as in the concatenation control unit 110c described above, the concatenation control unit 142c makes a control, according to a line size (type) setting, depending upon state transitions corresponding to an initial channel and a tributary channel for each channel of the input signal. In addition, the pointer value inserting unit 142b inserts a pointer value and a concatenation indication signal.

Further, as shown in FIG. 2, the STM transmitting circuit (STM frame transmitting apparatus) 15 includes a transmit SOH processing unit 150, an error detection information inserting unit 151, a scramble processing unit 152, a parallel/serial converter 153, and an electro opt converter 154.

Here, the transmit SOH processing unit 150 inserts the SOH in the output signal, specifically, inserts therein the K1, K2 bytes from an external interface unit (see reference numeral 18) and the undermentioned B1, B2 bytes from the error detection information inserting unit 151. Additionally, the pseudo-synchronization posting unit 15A of the transmit SOH processing unit 150 inserts the X byte which has been received from the F2 receiving circuit 12.

Besides, the error detection information inserting unit 151 inserts the B1, B2 bytes serving as error detection information, specifically, inserts the B1 byte depending upon a signal obtained by processing in the under-mentioned scramble processing unit 152, and inserts the B2 byte depending upon a signal obtained by predetermined arithmetic processing in the transmit SOH processing unit 150.

Further, the scramble processing unit 152 carries out scramble processing of data from the transmit SOH processing unit 150, the parallel/serial converter (P/S) 153 carries out speed conversion of parallel data obtained by the scramble processing into serial data, and the electro opt converter (E/O) 154 converts an electric signal into an optical signal.

In FIGS. 2 and 3, reference numeral 17 means an alarm generating unit (protection stage). When the pseudo-synchronization state is still detected in the pseudo-synchronization detecting unit 12A though the changed synchronization pattern transmitting unit 15A changes and transmits the synchronization pattern a predetermined number of times, the alarm generating unit 17 gives an alarm (link abnormality alarm). That is, the alarm generating unit 17 enables an early detection of link abnormality.

Further, in FIG. 2, reference numeral 16 means a drop insert monitor loopback (DIML) processing unit. The DIML processing unit 16 performs desired processing of a signal between the optical interface (first transmitter-receiver 1) and the cross connect. Specifically, a desired measuring apparatus (not shown) is set and connected external to the DIML processing unit 16, thereby extracting (drop) data from the optical interface to measure specific information, and inserting specific information in data from the optical interface to add some information to the data.

In addition, the DIML processing unit 16 monitors the data from the optical interface and data form the cross connect, and loops back to the transmitting unit 1B data from the receiving unit 1A of the optical interface when, for example, there is no exchange connected to the first transmitter-receiver 1 (see the terminal apparatus 4A in FIGS. 11 and 12).

Moreover, in FIG. 2, reference numeral 18 means the external interface unit to perform processing of the transmit data. The external interface unit 18 performs the processing (such as monitoring) of the transmission data depending upon data set by a user. Further, the external interface unit on the receiving side, not shown, similarly performs processing of receive data depending upon data set by the user.

Though the detailed description has been given of the configuration of the first transmitter-receiver 1 referring to FIG. 2, the second transmitter-receiver 2 connected to the first transmitter-receiver 1 through the optical fibers 50a, 50b is configured as in the first transmitter-receiver 1.

That is, the first transmitter-receiver 1 and the second transmitter-receiver 2 respectively include both of the system (see FIG. 3) for detecting the pseudo-synchronization posting information and transmitting the message to the effect that the pseudo-synchronization posting information is detected to the opposite apparatus, and the system (see FIG. 4) for changing the synchronization pattern in response to the pseudo-synchronization posting information from the opposite apparatus. It is thereby possible to rapidly detect the pseudo-synchronization state of the data transmitted between the apparatus, and rapidly perform resynchronization processing.

Figure 6:
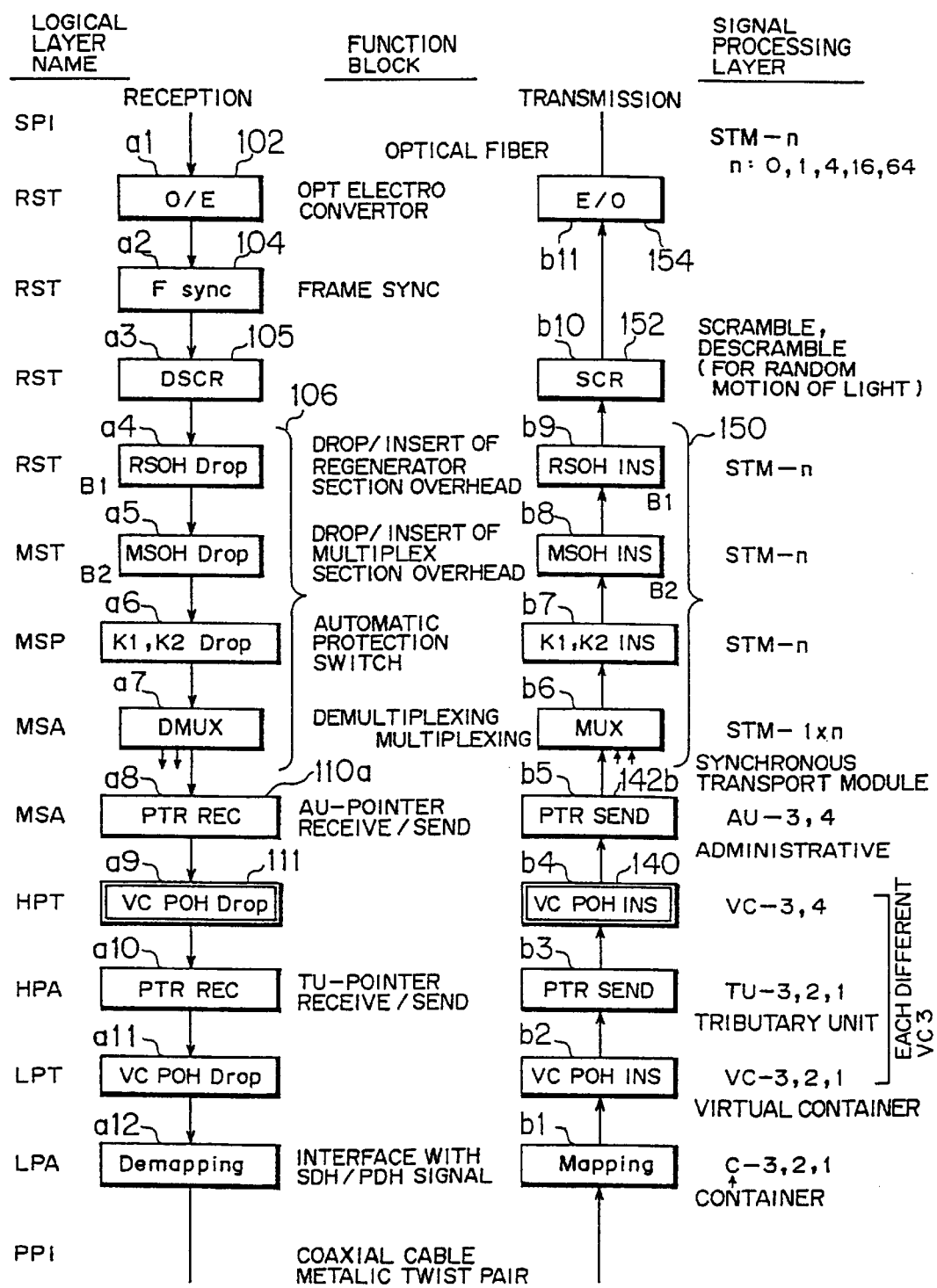
FIG. 6 is a diagram for explaining the operation of the first transmitter-receiver and its periphery according to one embodiment of the present invention.

According to the embodiment, the pseudo-synchronization preventing SDH transmission system 50 having the above configuration enables, for example, processing as shown in FIG. 6. A description will now be given of a case where the first transmitter-receiver 1 processes data transmitted from the second transmitter-receiver 2.

In a normal operation of the first transmitter-receiver 1, in response to data transmitted from the second transmitter-receiver 2, the O/E 102 converts the data (optical signal) into an electric signal (Step a1 in FIG. 6), and the S/P 103 carries out the speed conversion of the electric signal into a parallel signal. Subsequently, the frame synchronization detecting unit 104 detects depending upon the A1, A2 bytes in the SOH whether or not the synchronization of the STM frame is established (Step a2).

Thereafter, the descramble (DSCR) 105 performs the descramble processing (Step a3), and the receive SOH processing unit 106 extracts the B1 byte and the B2 byte in the SOH to detect whether or not an error occurs in the input signal (Steps a4: RSOH Drop, Step a5: MSOH Drop). Further, the receive SOH processing unit 106 extracts the K1 byte and the K2 byte (Step a6), and performs the demultiplexing (DMUX) after the supervision between the first transmitter-receiver 1 and the second transmitter-receiver 2 (Step a7).

Then, the receive pointer detecting unit 110a of the VC receiving circuit 11 detects a pointer (AU pointer) of the above demultiplexed data (Step a8), and the receive POH processing unit 111 extracts operation and maintenance information (POH) of each of the demultiplexed data after several processing such as concatenation control (Step a9). At the same time, the F2 byte is extracted.

Subsequently, as shown in FIG. 3, the frame pattern detecting unit 120 of the F2 receiving circuit 12 detects a synchronization pattern, and the synchronization pattern causes the main counter 121a to start the hunting. After establishment of the synchronization, the subcounter 121b starts the hunting from a position different from the frame timing.

Moreover, the protection stages 122a, 122b detect whether or not the synchronization patterns are accurate. If in synchronization, the protection stages 122a, 122b transmit synchronization information (SYNC) to the arithmetic logic unit 123, and transmit timing information (Tim) to the frame pattern removing unit 12B. Thereafter, the frame pattern is removed from the F2 byte to extract desired data (D1 to D8; see FIG. 5) from the F2 byte.

Further, the DIML processing unit 16 performs above desired processing of the POH extracted in the above receive POH processing unit 111. Thereafter, for transmission to the cross connect, the DIML processing unit 16 detects a pointer (TU pointer) (step a10 in FIG. 6), and detects operation and maintenance information (POH) for each container (Step a11), thereby disassembling (demapping) information of the VC layer to provide containers (Step a12; connection to an SDH/PDH signal). Thereafter, the data is transmitted through, for example, a coaxial cable (metallic twist pair) to be received in a terminal via an exchange.

On the other hand, at the time of transmission, the first transmitter-receiver 1 uses the optical interface to accommodate data transmitted from the terminal through the coaxial cable in the container (Step b1; mapping), thereafter providing operation and maintenance information (POH) for each container (Step b2). Subsequently, a pointer (TU pointer) is provided for the data provided with the POH (Step b3), and the data provided with the TU pointer are multiplexed.

Further, in the first transmitter-receiver 1, the transmit POH processing unit 140 provides the multiplexed data with operation and maintenance information (POH) for multiplexed information (Step b4), and the pointer value inserting unit 142b provides the data with a pointer (AU pointer) (Step b5), thereafter multiplexing the resultant data to provide an STM frame (Step b6).

Thereafter, the transmit SOH processing unit 150 inserts in the STM frame K1, K2 bytes serving as information for supervision between the first transmitter-receiver 1 and the second transmitter-receiver 2 (Step b7), and inserts therein a B2 byte and a B1 byte used for signal error detection (Step b8; MSOH INS, and Step b9; RSOH INS).

Subsequently, the scramble 152 performs the scramble processing of the data from the transmit SOH processing unit 150 (Step b10), the P/S 153 carries out the speed conversion of the resultant data into the serial data, and the E/O 154 converts the resultant data (electric signal) into the optical signal (Step b11).

Incidentally, when the pseudo-synchronization occurs in the series of processing, the following processing are performed. A description will hereinafter be given of a case where data from the second transmitter-receiver 2 is put in a pseudo-synchronization state in the first transmitter-receiver 1.

That is, in the first transmitter-receiver 1, at a time of reception of the input data, the F2 receiving circuit 12 finds the same pattern as the synchronization pattern in the F2 byte information, thereby detecting that the pseudo-synchronization state is established (pseudo-synchronization detecting step). Then, the first transmitter-receiver 1 inserts in the X byte of the overhead of the STM frame the information to the effect that the pseudo-synchronization state is established [Step C1 of FIG. 1(b)], and posts the information to the receiving unit 2A in the second transmitter-receiver 2 [pseudo-synchronization posting step; Step C2 of FIG. 1(b)].

For example, as shown in FIG. 7(a), in response to input data, the main counter 121a detects a true synchronization pattern in the F2 byte [see the arrows A in FIG. 7(a)], and the main counter 121a makes a transition from the hunting of the synchronization pattern to a synchronization state [see the arrow A1 in FIG. 7(b)].

At this point in time, the subcounter 121b detects a pseudo-synchronization pattern which is the same synchronization pattern as the true synchronization pattern in the above F2 byte with phases mutually shifted [see the arrows B in FIG. 7(a)]. As shown in FIG. 7(c), the subcounter 121b makes the transition from the hunting state to the synchronization state depending upon the pseudo-synchronization pattern [see the arrow B1 in FIG. 7(c)].

More, in the above discussion, the protection stages 122a, 122b give the decisions of synchronization in response to input of the two true synchronization patterns to establish the synchronization state, while starting the hunting when at least one of the true synchronization patterns is not inputted (in two forward stages and a single backward stage).

When the synchronization is established in each of the main counter 121a and the subcounter 121b, in the F2 receiving circuit 12, the AND circuit 123a (see FIG. 3) of the arithmetic logic unit 123 outputs a pseudo-synchronization flag (information to the effect that the pseudo-synchronization state is established). Moreover, as shown in FIG. 7(d), the pseudo-synchronization flag is outputted for a period for which the synchronization is established in each of the main counter 121a and the subcounter 121b [pseudo-synchronization period; see the interval C in FIG. 7(d)].

Thereafter, the transmitting unit 1B (pseudo-synchronization posting unit 15A) transmits the pseudo-synchronization flag (X byte) [Step C2 in FIG. 1(b)], and the STM receiving circuit 20 in the second transmitter-receiver 2 receives information to this effect to post the information to the F2 transmitting circuit 23 of the transmitting unit 2B [pseudo-synchronization posting step; Step C3 in FIG. 1(b)].

Further, when the information to the effect that the pseudo-synchronization state is established is posted to the F2 transmitting circuit 23, as shown in FIG. 5, the synchronization pattern changing unit 23A makes a change of the synchronization pattern into a synchronization pattern (Fb, Fa) different from the synchronization pattern (Fa, Fb) in the F2 byte, and the changed synchronization pattern transmitting unit 23B transmits the synchronization pattern (Fb, Fa) obtained by the change to the receiving unit 1A in the first transmitter-receiver 1 [changed synchronization pattern transmitting step; Step C4 in FIG. 1(b)].

Subsequently, in the F2 receiving circuit 12 of the receiving unit 1A in the first transmitter-receiver 1, since any one of the two counters 121a and 121b exits from the pseudo-synchronization state, the detection pattern changing information is transmitted to the frame pattern detecting unit 120. Depending upon the changed synchronization pattern, any one of the counters (the main counter 121a in the illustration) detects a true synchronization pattern [see the arrows A in FIG. 8(a)] [see the arrow A2 in FIG. 8(b)]. At the same time, the subcounter 121b counts the changed synchronization pattern without detecting the above pseudo-synchronization pattern [see the arrows B in FIG. 8(a)].

Figure 8A:
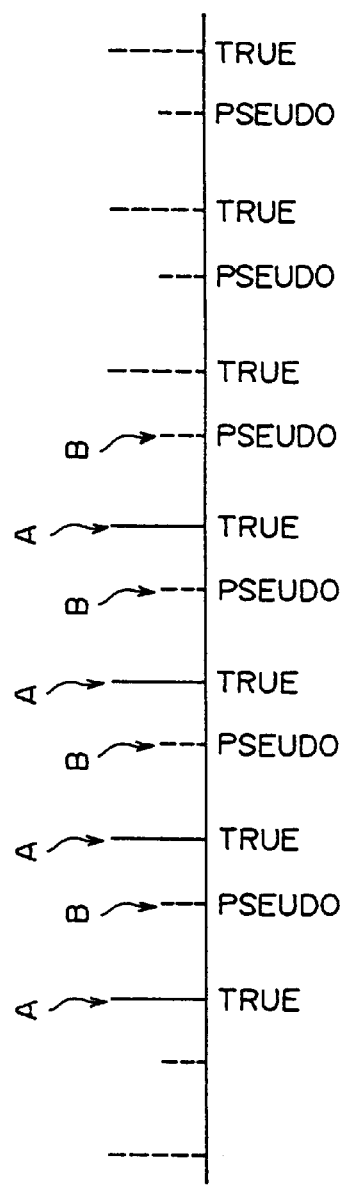
FIGS. 8(a) to 8(d) are diagrams for explaining a method of detecting pseudo-synchronization by counters after a change of synchronization pattern according to one embodiment of the present invention.
Figure 8B:
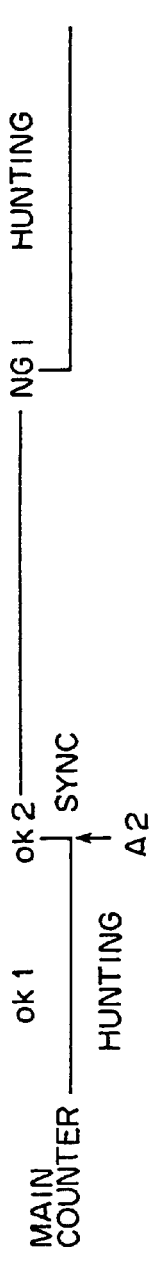
Figure 8C:
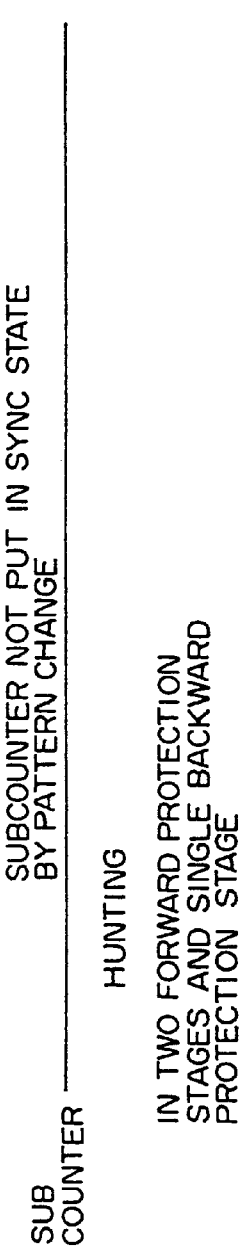

That is, since the pseudo-pattern (Fa, Fb) shown in FIG. 8(a) is data having the same synchronization pattern as the true synchronization pattern before the change of the synchronization pattern, the above change of the synchronization pattern results in an additional synchronization pattern different from the true synchronization pattern (Fb, Fa). Thus, the subcounter 121b does not detect the above pseudo-pattern as shown in FIG. 8(c).

Figure 8D:
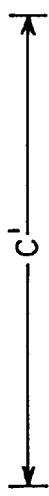

In the F2 receiving circuit 12, the XOR circuit 123b of the arithmetic logic unit 123 (see FIG. 3) thereby outputs synchronization establishment information. That is, as shown in FIG. 8(d), it is possible to regard as a true synchronization period only a period for which the synchronization state counted by the counter 121a is kept [see the interval C' in FIG. 8(d)].

Moreover, when the pseudo-synchronization state is still detected though the changed synchronization pattern transmitting unit 23B in the second transmitter-receiver 2 changes and transmits the above synchronization pattern a predetermined number of times (when, for example, the pseudo-synchronization state is kept for one second or more), the alarm generating unit 17 gives the alarm (alarm generating step), resulting in a decision of link abnormality.

As stated above, according to the pseudo-synchronization preventing SDH transmission system 50 of the present invention, when the pseudo-synchronization is detected depending upon the synchronization pattern of the F2 byte of the data, the message to the effect that the pseudo-synchronization is established is posted by using the layer (the X byte in the unused overhead) higher than the layer of the F2 byte, and the apparatus to which the message is posted changes and returns the synchronization pattern. As a result, there are advantages in that the pseudo-synchronization state can rapidly be prevented, and throughput of the terminal apparatus to which the present system is applied can significantly be enhanced.

Further, according to the present invention, when the pseudo-synchronization state is still kept though the synchronization pattern is changed the predetermined number of times, the alarm is given. It is thereby possible to make the early detection of the link abnormality, and rapidly perform the resynchronization processing in the system.

In addition, according to the present invention, the pseudo-synchronization preventing SDH transmission system 50 is provided with the two counters 121a, 121b, and establishes the frame synchronization in response to the receive signal by itself. Consequently, it is possible to carry out the predetermined count processing of any type of input signal such as signal sequence with a high error rate, or signal requiring the fixed signaling. As a result, there are advantages in that a scope of application of the system can be expanded, and versatility can be enhanced.

(d) Others

Incidentally, though the embodiment has been described with reference to a case where the present invention is applied to the linear network, it is to be noted that the present invention may be applied to a ring network.

Specifically, since the ring network is a network including a plurality of nodes (terminal apparatus), the first transmitter-receiver 1 and the second transmitter-receiver 2 described above referring to FIG. 1 are opposed to each other through the other nodes on the optical fibers 50a, 50b.

In the case of ring network, in order to determine which node is put in a pseudo-synchronization state, pseudo-synchronization posting information and information of each node (office code) are transmitted after being added into X byte serving as unused byte in byte information.

Moreover, the X byte is set to make a transmission to the next node EAST in the case of a transmission from an adjacent node EAST, or make a transmission to the next node WEST in the case of a transmission from a node WEST. Further, since each node is provided with optical interfaces (optical IF boards) for EAST and WEST, a transmission from EAST to WEST (loopback) is made by passing a pseudo-synchronization flag (pseudo-synchronization posting information) between the above two optical IF boards.

It must be noted that the present invention should not be limited to the embodiment described above, and variations and modifications may be made without departing from the spirit or scope of the following claims.

What is claimed is:

1. A pseudo-synchronization prevention method in an SDH transmission mode, the method comprising:
   when a data transmission is made in the SDH transmission mode between a first transmitter-receiver and a second transmitter-receiver opposed to each other by using predetermined byte information in a VC path in an STM frame;
   a pseudo-synchronization detecting step of detecting, by a receiver in one transmitter-receiver of the first transmitter-receiver and the second transmitter-receiver, that a pseudo-synchronization state is established by finding the same pattern as a synchronization pattern in the byte information;
   a pseudo-synchronization posting step of, when establishment of the pseudo-synchronization state is detected in the pseudo-synchronization detecting step, causing a transmitter in the one transmitter-receiver to insert information to the effect that the pseudo-synchronization state is established in an overhead of the STM frame, and posting the information to a receiver in the other transmitter-receiver of the first transmitter-receiver and the second transmitter-receiver;
   and a changed synchronization pattern transmitting step of, when the establishment of the pseudo-synchronization state is posted to the receiver in the other transmitter-receiver in the pseudo-synchronization posting step, changing a synchronization pattern into an additional synchronization pattern different from the synchronization pattern in the byte information, and transmitting the synchronization pattern obtained by the change from a transmitter in the other transmitter-receiver to the receiver in the one transmitter-receiver.

2. A pseudo-synchronization prevention method in an SDH transmission mode according to claim 1, further comprising an alarm generating step of giving an alarm when a pseudo-synchronization state is still detected in the pseudo-synchronization detecting step though a synchronization pattern is changed and transmitted a predetermined number of times in the changed synchronization pattern transmitting step.

3. A pseudo-synchronization preventing SDH transmission system comprising:

a first transmitter-receiver and a second transmitter-receiver opposed to each other for a data transmission made by using predetermined byte information in a VC path in an STM frame, wherein a byte information receiving apparatus in one transmitter-receiver of the first transmitter-receiver and the second transmitter-receiver is provided with a pseudo-synchronization detecting unit to detect that a pseudo-synchronization state is established by finding the same pattern as a synchronization pattern in the byte information;

an STM frame transmitting apparatus in the one transmitter-receiver being provided with a pseudo-synchronization posting unit to, when the pseudo-synchronization detecting unit detects that the pseudo-synchronization state is established, insert information to the effect that the pseudo-synchronization state is established in an overhead of the STM frame, and post the information to an STM frame receiving apparatus in the other transmitter-receiver of the first transmitter-receiver and the second transmitter-receiver;

the STM frame receiving apparatus in the other transmitter-receiver being provided with a pseudo-synchronization posting information receiving unit to receive the information to the effect that the pseudo-synchronization state is established, posted from the pseudo-synchronization posting unit; and a byte information transmitting apparatus in the other transmitter-receiver being provided with a synchronization pattern changing unit to change a synchronization pattern into an additional synchronization pattern different from the synchronization pattern in the byte information, and a changed synchronization pattern transmitting unit to transmit the synchronization pattern obtained by the change in the synchronization pattern changing unit to the byte information receiving apparatus in the one transmitter-receiver.

4. A pseudo-synchronization preventing SDH transmission system according to claim 3, wherein the pseudo-synchronization detecting unit comprises a plurality of counters to detect the synchronization pattern in the byte information or an additional synchronization pattern identical with the synchronization pattern with phases mutually shifted, and an arithmetic logic unit to perform arithmetic logic processing depending upon results of pattern detection in the counters so as to detect that the pseudo-synchronization state is established.

5. A pseudo-synchronization preventing SDH transmission system according to claim 4, further comprising an alarm generating unit to give an alarm when the pseudo-synchronization state is still detected in the pseudo-synchronization detecting unit though the changed synchronization pattern transmitting unit changes and transmits the synchronization pattern a predetermined number of times.

6. In an SDH transmission system having a transmitter-receiver to make a data transmission to an additional opposite transmitter-receiver by using predetermined byte information in a VC path in an STM frame in an SDH transmission mode, a transmitter-receiver in a pseudo-synchronization preventing SDH transmission system, the transmitter-receiver comprising:

an STM frame receiving apparatus to make a reception in a layer of the STM frame, and a byte information receiving apparatus connected to the STM frame receiving apparatus to receive predetermined byte information in the VC path of an order lower than that of the STM frame; and a byte information transmitting apparatus to transmit byte information of the same layer as that of the byte information, and an STM frame transmitting apparatus connected to the byte information transmitting apparatus to make a transmission in the layer of the STM frame, wherein the byte information receiving apparatus is provided with a pseudo-synchronization detecting unit to detect that a pseudo-synchronization state is established by finding the same pattern as a synchronization pattern in predetermined byte information in a VC path in an STM frame received through the STM frame receiving apparatus, and the STM frame transmitting apparatus being provided with a pseudo-synchronization posting unit to, when the pseudo-synchronization detecting unit detects that the pseudo-synchronization state is established, insert information to the effect that the pseudo-synchronization state is established in an overhead of the STM frame, and post the information to an STM frame receiving apparatus in an additional opposite transmitter-receiver.

7. A transmitter-receiver in a pseudo-synchronization preventing SDH transmission system according to claim 6, further comprising an alarm generating unit to give an alarm when the pseudo-synchronization state is still detected in the pseudo-synchronization detecting unit though the synchronization pattern transmitted from the additional transmitter-receiver is changed a predetermined number of times.

8. In an SDH transmission system having a transmitter-receiver to make a data transmission to an additional opposite transmitter-receiver by using predetermined byte information in a VC path in an STM frame in an SDH transmission mode, a transmitter-receiver in a pseudo-synchronization preventing SDH transmission system, the transmitter-receiver comprising:

an STM frame receiving apparatus to make a reception in a layer of the STM frame, and a byte information receiving apparatus connected to the STM frame receiving apparatus to receive predetermined byte information in the VC path of an order lower than that of the STM frame; and a byte information transmitting apparatus to transmit byte information of the same layer as that of the byte information, and an STM frame transmitting apparatus connected to the byte information transmitting apparatus to make a transmission in the layer of the STM frame, wherein the STM frame receiving apparatus is provided with a pseudo-synchronization posting information receiving unit to receive information to the effect that the pseudo-synchronization state is established from an additional opposite transmitter-receiver; and the byte information transmitting apparatus being provided with a synchronization pattern changing unit to change a synchronization pattern into an additional synchronization pattern different from the synchronization pattern in the byte information, and a changed synchronization pattern transmitting unit to transmit the synchronization pattern obtained by the change in the synchronization pattern changing unit to an additional opposite transmitter-receiver.

* * * * *